United States Patent
Hirata et al.

(10) Patent No.: US 7,589,844 B2
(45) Date of Patent: Sep. 15, 2009

(54) SHAPE INSPECTION METHOD AND APPARATUS

(75) Inventors: Kazuhiko Hirata, Chiyoda-ku (JP);
Tatsuo Yajima, Chiyoda-ku (JP);
Yoshiyuki Sonda, Chiyoda-ku (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 12/014,409

(22) Filed: Jan. 15, 2008

(65) Prior Publication Data

US 2008/0316501 A1 Dec. 25, 2008

Related U.S. Application Data

(63) Continuation of application No. PCT/JP2006/314103, filed on Jul. 14, 2006.

(30) Foreign Application Priority Data

Jul. 15, 2005 (JP) ............................. 2005-206498

(51) Int. Cl.
*G01B 11/24* (2006.01)
(52) U.S. Cl. .................................... 356/601; 356/239.1
(58) Field of Classification Search ... 356/239.1–239.3, 356/239.7, 239.8, 600–613
See application file for complete search history.

(56) References Cited

U.S. PATENT DOCUMENTS

| | | | | |
|---|---|---|---|---|
| 5,309,222 A * | 5/1994 | Kamei et al. | ................. | 356/613 |
| 5,367,378 A * | 11/1994 | Harding et al. | ............. | 356/613 |
| 5,568,258 A * | 10/1996 | Uemura et al. | ........... | 356/237.1 |
| 6,392,754 B1 * | 5/2002 | Pingel et al. | ................. | 356/603 |
| 7,430,049 B2 * | 9/2008 | Bertin-Mourot et al. | .... | 356/605 |
| 7,471,383 B2 * | 12/2008 | Ehrick | ..................... | 356/239.1 |
| 7,495,760 B2 * | 2/2009 | Miyake et al. | ........... | 356/239.1 |
| 2004/0174540 A1 * | 9/2004 | Saito | ......................... | 356/612 |
| 2007/0091319 A1 * | 4/2007 | Sonda et al. | ................ | 356/600 |
| 2009/0009774 A1 * | 1/2009 | Himmi et al. | ............... | 356/602 |

FOREIGN PATENT DOCUMENTS

| | | | |
|---|---|---|---|
| JP | 4-242103 A | | 8/1992 |
| JP | 8-61930 A | | 3/1996 |
| JP | 2000-131047 A | | 5/2000 |
| JP | 2000-146565 A | | 5/2000 |
| JP | 2003-344041 A | | 12/2003 |

* cited by examiner

*Primary Examiner*—Hoa Q Pham
(74) *Attorney, Agent, or Firm*—Oblon, Spivak, McClelland, Maier & Neustadt, P.C.

(57) ABSTRACT

Shape inspection is carried out without preparing an inspection apparatus for each model of product.

There is provided a shape inspection method comprising a first step of placing an object to be measured on an inspection stand for actual measurement, a second step of obtaining information of the surface shape of the object, a third step of calculating shape data of the object in a weightless state based on the information of the surface shape of the object, and a fourth step of recalculating the shape data of the object in a state that the object is placed on a predetermined inspection stand based on the shape data in the weightless state of the object, and judging the quality of the object based on the recalculated shape data of the object.

20 Claims, 20 Drawing Sheets

S1: PLACE A GLASS SHEET ON AN INSPECTION STAND OF THREE POINT SUPPORTING

S2: CAPTURE IMAGE OF GLASS SHEET

S3: EXTRACT THE PROFILE AND CALCULATE THREE-DIMENSIONAL SHAPE OF GLASS SHEET

S4: CALCULATE THREE-DIMENSIONAL SHAPE IN A WEIGHTLESS STATE

S5: CALCULATE SHAPE IN A STATE THAT THE GLASS SHEET IS PLACED ON A PREDETERMINED INSPECTION STAND

S41: TO CALCULATED THREE-DIMENSIONAL SHAPE, FORCE IN A DIRECTION OPPOSITE TO GRAVITY IS APPLIED TO DEFORM THE GLASS SHEET, AND ITS SHAPE IS DESIGNATED AS "INITIAL SHAPE"

S42: SIMULATE A STATE THAT THE GLASS SHEET OF "INITIAL STATE" IS PLACED ON AN INSPECTION STAND OF THREE POINT SUPPORTING

S43: COMPARE THE SIMULATION RESULT AND ACTUALLY MEASURED SHAPE OF GLASS SHEET ON AN INSPECTION STAND OF THREE POINT SUPPORTING

S44: DIFFERENCES (DISPLACEMENTS IN Z DIRECTION) AT NODES WITHIN TOLERANCE RANGE?

S45: DEFORM "INITIAL STATE" SO AS TO REDUCE THE DIFFERENCES AT NODES

S46: DETERMINE "INITIAL STATE" AS THREE-DIMENSIONAL SHAPE IN WEIGHTLESS STATE (a) INSPECTION STAND FOR ACTUAL MEASUREMENT (b) WEIGHTLESS STATE (c) PREDETERMINED INSPECTION STAND (a)  (b)

S31: CALCULATE THREE-DIMENSIONAL SHAPE in WEIGHTLESS STATE FROM DESIGN SHAPE DATA

S32: CALCULATE SHAPE IN A STATE THAT OBJECT IS PLACED ON INSPECTION STAND OF THREE POINT SUPPORTING

S33: PLACE A GLASS SHEET ON INSPECTION STAND OF THREE POINT SUPPORTING

S34: CAPTURE IMAGE OF GLASS SHEET

S35: ABSTRACT OUTLINE AND CALCULATE THREE-DIMENSIONAL SHAPE OF GLASS SHEET

S311: TO CALCULATED THREE-DIMENSIONAL SHAPE, FORCE IN A DIRECTION OPPOSITE TO GRAVITY IS APPLIED TO DEFORM THE GLASS SHEET, AND ITS SHAPE IS DESIGNATED AS "INITIAL SHAPE"

S312: SIMULATE A STATE THAT THE GLASS SHEET OF "INITIAL STATE" IS PLACED ON AN INSPECTION STAND OF THREE POINT SUPPORTING

S313: COMPARE THE SIMULATION RESULT AND ACTUALLY MEASURED SHAPE OF GLASS SHEET ON AN INSPECTION STAND OF THREE POINT SUPPORTING

S314: DIFFERENCES (DISPLACEMENTS IN Z DIRECTION) AT NODES WITHIN TOLERANCE RANGE?

S315: DEFORM "INITIAL STATE" SO AS TO REDUCE THE DIFFERENCES AT NODES

S316: DETERMINE "INITIAL STATE" AS THREE-DIMENSIONAL SHAPE IN WEIGHTLESS STATE (a) DESIGN SHAPE DATA OF AN OBJECT PLACED ON A PREDETERMINED INSPECTION STAND (b) WEIGHTLESS STATE (c) DESIGN SHAPE DATA OF AN OBJECT PLACED ON AN INSPECTION STAND FOR ACTUAL MEASUREMENT (d) INSPECTION STAND FOR ACTUAL MEASUREMENT (a)

(b)

(c)

SHAPE INSPECTION METHOD AND APPARATUS

TECHNICAL FIELD

The present invention relates to a method and an apparatus for shape inspection, particularly to a method and an apparatus suitable for shape inspection of window glasses for automobiles.

BACKGROUND ART

Heretofore, for window glasses for automobiles, ones having various curved shapes accommodated to designs of automobiles, are employed. These window glasses are produced by cutting a plate-shaped glass sheet produced by e.g. a float method into a desired shape, heating and softening it and bending it by e.g. a press-forming. For side glasses or rear glasses, a tempered glass is commonly used, and by immediately air-cooling a heated glass sheet after bending, a so-called physically tempered glass is produced.

Meanwhile, a laminated glass to be employed for windshields is produced by placing two glass sheets cut out to have substantially the same shape, on a ring-shaped jig so that they are overlaid, and heating them to be bent into a desired curved shape by their own weight. After the bending, they are gradually cooled without being air-cooled for tempering, as in the case of tempered glass. Thereafter, an interlayer (such as polyvinyl butyral) is sandwiched between the bent two glass sheets, a preliminary pre-pressing treatment in a vacuum bag and subsequent heating and pressurizing treatments in a autoclave are carried out to produce a laminated glass in which the glass sheets and the interlayer are laminated.

When a curved glass thus produced is assembled into an automobile, high shape reproducibility is required. In a case of door glass which is slidable up and down by an operation of a driver/passenger to close or open the window, if a predetermined design shape of the glass is not produced, the glass may be collided or frictioned with e.g. metallic members to be damaged when it is slid. Further, in a case of fixed window such as an windshield or a rear glass, if the reproducibility of the shape is poor, it becomes difficult to attach the glass to an opening, and see-through distortion (a phenomenon that an image through a glass is distorted) or a reflection distortion (a phenomenon that an image reflected by a glass surface is distorted) may occur as problem unique to window glasses.

To cope with these problems, heretofore, a glass sheet after bending has been placed on an inspection apparatus (refer to e.g. Patent Document 1) called as a gauge to carry out shape inspection, and only glass sheets having a predetermined shape accuracy have been employed for production of automobiles. Such a gauge is an inspection mold having a placing plane formed so as to fit to a predetermined design shape, and a plurality of distance sensors are embedded in the placing plane. By measuring the distance from the surface of the mold to a rear surface of a glass sheet, displacement of the shape of the glass sheet from its design shape, is measured to evaluate the accuracy of the shape. Heretofore, an inspection using such a gauge has been carried out with respect to all or sampled formed glass sheet.

Patent Document 1: JP-A-4-242103

DISCLOSURE OF THE INVENTION

Problems to be Solved by the Invention

However, in an inspection using a gauge, a step of placing a glass sheet is required for every single glass sheet, whereby improvement of productivity is limited. Further, since it is necessary to prepare a gauge for every model of final product, a large number of gauges are required to cope with production of recent various types of automobiles. Further, since such a gauge has a size equal or larger than a window glass, there is such a problem that a wide space is required to store a large number of gauges prepared for every model. There is also a problem that these gauges needs to be stored for a long time considering repairment purpose in the future.

The present invention is to solve these problems, and it is an object of the present invention to provide a method and an apparatus for shape inspection which does not require preparing of an inspection apparatus for each model of product.

Means for Solving the Problems

In order to achieve the above object, the present invention provides a shape inspection method comprising a first step of placing an object to be measured on an inspection stand for actual measurement, a second step of obtaining information of the surface shape of the object, a third step of calculating shape data of the object in a weightless state based on the information of the surface shape of the object, and a fourth step of recalculating the shape data of the object in a state that the object is placed on a predetermined inspection stand based on the shape data in the weightless state of the object, and judging the quality of the object based on the recalculated shape data of the object.

Further, an embodiment of the shape inspection method according to the present invention includes the following construction. Namely, it is preferred that the shape data of the object in the weightless state is obtained by simulating a state in which a force having a direction opposite from that of the gravity is applied to the object having the shape data obtained by the actual measurement. It is preferred that the shape inspection method comprises instead of the forth step, a step of judging the quality of the object based on comparison of the shape data of the object in the weightless state calculated in the third step with predetermined design data of the object. It is preferred that in the second step, the image of the object is captured and the surface shape data is obtained from the captured image.

Further, another embodiment of the shape inspection method according to the present invention provides a shape inspection method comprising a first step of calculating design shape data of an object to be measured in a weightless state based on design shape data of the object in a state that the object is placed on a predetermined inspection stand, a second step of calculating design shape data of the object in a state that the object is placed on an inspection stand for actual measurement, based on the design shape data of the object in a weightless state, a third step of placing the object on the inspection stand for actual measurement, a fourth step of obtaining information of the surface shape of the object, and a fifth step of judging the quality of the object based on the design shape data of the object in a state that the object is placed on the inspection stand for actual measurement and the information of the surface shape of the object.

Further, in this embodiment, it is preferred that the design shape data of the object in a weightless state is obtained by a computer simulation simulating a state in which a force in a direction opposite from the gravity is applied to the object having design shape data in a state that the object is placed on a predetermined inspection tale.

It is preferred that the shape inspection method comprises instead of the first step and the second step, a step of calculating design shape data of the object in a state that the object is placed on the inspection stand for actual measurement, based on design shape data of the object in a state that the object is placed on a predetermined inspection stand. It is preferred that in the fourth step, image of the object is captured and the surface shape data is calculated from the captured image.

Further, in the shape inspection method according to the present invention, it is preferred that the object is a glass plate. It is preferred that the glass plate is a window glass for automobiles.

Further, the present invention provides a shape inspection apparatus comprising an inspection stand for actual measurement to be used for placing an object to be measured, a camera for obtaining information of the surface shape of the object, and a computer for calculating the shape data of the object in a weightless state based on the information of the surface shape of the object, recalculating the shape data of the object in a state that the object is placed on a predetermined inspection stand based on the shape data of the object in the weightless state, and judging the quality of the object based on the recalculated shape data.

Further, an embodiment of the shape inspection apparatus according to the present invention includes the following construction. Namely, the computer judges the quality of the object based on comparison of the shape data of the object in the weightless state calculated and predetermined design shape data of the object, instead of recalculating shape data of the object in the state that the object is placed on the predetermined inspection stand and judging the quality of the object based on the recalculated shape data.

Further, another embodiment of the shape inspection apparatus according to the present invention provides a shape inspection apparatus comprising an inspection stand for actual measurement on which an object to be measured is placed, a camera for obtaining information of the surface shape of the object, and a computer for calculating design shape data of the object in a weightless state based on design shape data of the object in a state that the object is placed on a predetermined inspection stand, and calculating design shape data of the object in a state that the object is placed on the inspection stand for actual measurement based on the design shape data of the object in the weightless state, and judging the quality of the object based on the calculated design shape data and the information of the surface shape of the object.

Further, in an embodiment, the computer calculates design shape data of the object in a state that the object is placed on the inspection stand for actual measurement based on design shape data of the object in a state that the object is placed on a predetermined inspection stand, instead of calculating design shape data of the object in a weightless state based on design shape data of the object in a state that the object is placed on the predetermined inspection stand and calculating design shape data of the object in a state that the object is placed on the inspection stand for actual measurement based on the design shape data of the object in a weightless state.

Further, in the shape inspection apparatus according to the present invention, it is preferred that the inspection stand for actual measurement has a first, a second and a third supporting portions for supporting the object.

EFFECTS OF THE INVENTION

In the present invention, by simulating the shape of an object to be measured, in a weightless state (namely, a state in which effect of gravity is removed) from the shape of the object actually measured, it is possible to judge the shape quality of the object without having influence of deflection caused by gravity. Further, by simulating a state in which the object is placed on a predetermined inspection stand from the shape of the object in the weightless state, it is possible to simulate inspections of the object using a plurality of inspection stand without actually preparing these inspection stand.

Further, since the inspection stand for actual measurement provided with the first, the second and the third supporting portions for supporting an object to be measured, is an inspection stand of three point supporting, which can always support the object regardless of the shape of the object, the inspection stand is suitable in that it can be commonly used for all types of objects.

Further, by simulating the shape of an object-to-be-measured in a weightless state from the design shape data of the object and simulating the shape of the object placed on an inspection stand for actual measurement, it is possible to carry out comparative evaluation of actually measured shape of the object placed on a general inspection stand for actual measurement, with the simulated shape, and thus, it is possible to simulate inspections of a plurality of cases using different inspection stand without actually preparing these inspection stand. Further, by obtaining a state that the object is placed on an inspection stand for actual measurement from its design shape data, the amount of calculation after the object is measured can be reduced, and the inspection can be smoother.

BRIEF DESCRIPTION OF DRAWINGS

FIGS. 23(*b*) and 23(*c*): Plan views showing comparison of simulation result with actually measured data.

EXPLANATION OF NUMERALS

Figure 1:
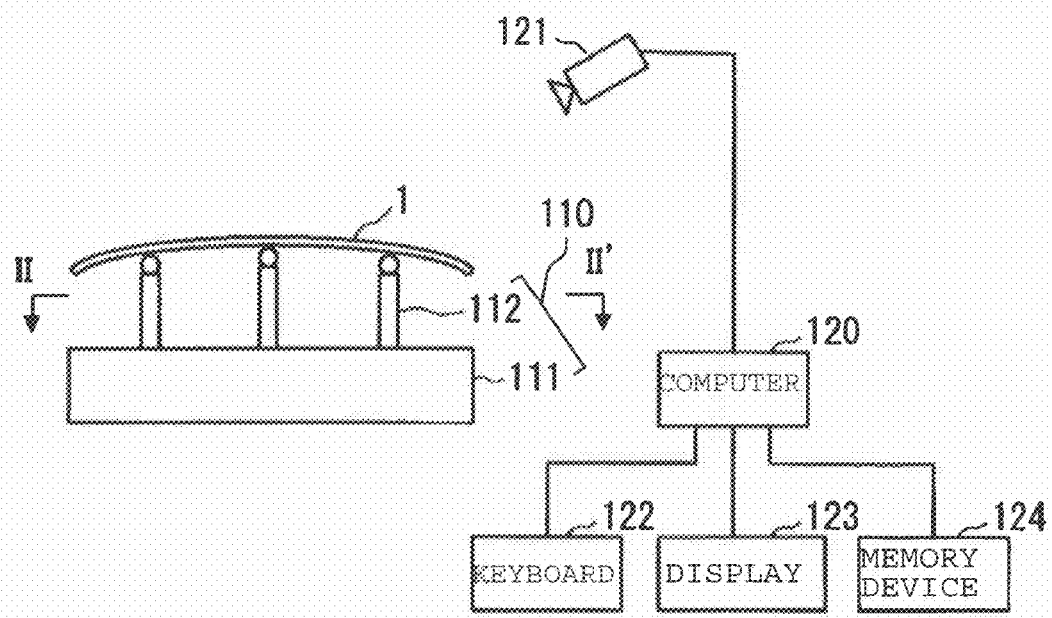
FIG. 1: An explanation view showing an embodiment of the inspection apparatus according to the present invention.

1: Object to be measured
2: Plane light source
3: Color pattern
4: Hole in a color pattern
5: Main color camera
6, 7: Sub color camera
8: Computer
9: View field of main color camera
10, 11: View field of sub color camera
12: Basic pattern constituting a color pattern
13: First stripe pattern in a basic pattern
14: Second stripe pattern in a basic pattern
15: Viewpoint of main color camera
16: Sampling point on an object to be measured
17: Reference point on a color pattern
18: Normal vector
19: Incident angle
20: Reflection angle
21: Image of a sampling point captured by a color camera
22: A sampling point to obtain a first normal vector in view field of main color camera
23: Reference point projected on point 22 when reflection image is captured by a main color camera
24: Basic point
25: Sampling point in the vicinity of point 22
26: Reference point projected on point 25 when reflection image is captured by main color camera
27: Sampling point in view fields of main color camera and sub color camera at the same time
28: Reference point projected on point 27 when reflection image is captured by a sub color camera
29: Normal vector at point 27 obtained from reflection image captured by main color camera
30: Predicted reference point
31: Light path calculated for obtaining predicted reference point
32: Normal vector at point 27 obtained from reflection image captured by a sub color camera
33: Correction vector
110: Inspection stand
111: Table
112: Rod
120: Computer
121: Camera
122: Keyboard
123: Display
124: Memory device

BEST MODE FOR CARRYING OUT THE INVENTION

Now, an embodiment of the present invention is described.

Figure 2:
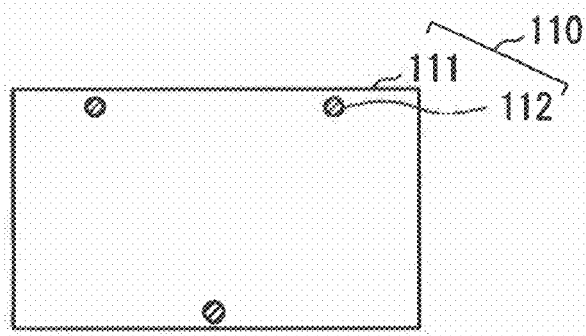
FIG. 2: A plan view (a view observed in the direction of arrows from the line II-II' FIG. 1) showing an inspection stand.

FIG. 1 is an explanation view showing an embodiment of the inspection apparatus according to the present invention. As shown in the figure, an inspection stand 110 (which corresponds to the inspection stand for actual measurement in the Claims) is constituted by a base 111 having a rectangular shape in top view and three rods 112 attached to the base so as to protrude upwardly therefrom to support the backside of an object 1 to be measured such as a glass sheet (refer to FIG. 2). The three rods 112 are arranged on the top surface of the base 111 so that they are positioned at respective apexes of a triangle. At leading edges of the rods 112, pads made of e.g. a resin are attached, and the object 1 to be measured is placed on these pads. By employing three rods and appropriately adjusting the positions and the lengths of the rods, it is always possible to support the backside of a glass sheet regardless of the shape of the glass sheet, such being preferred.

Meanwhile, a camera 121 is disposed above the object 1 to be measured, for capturing an image of the surface of the object 1 to be measured, and a computer 120 constituted by e.g. a personal computer or a workstation for retrieving the image captured by the camera 121 and carrying out image processing of the image retrieved. To the computer 120, various types of input/output devices are connected, and for example, the computer is provided with e.g. a keyboard 122, a display 123 such as a LCD and a memory device 124 such as a hard disk drive. In the memory device 124, e.g. image data captured and programs for image processing or drive control of the camera, are stored.

Then, inspection procedure according to the present invention is described.

Figure 3:
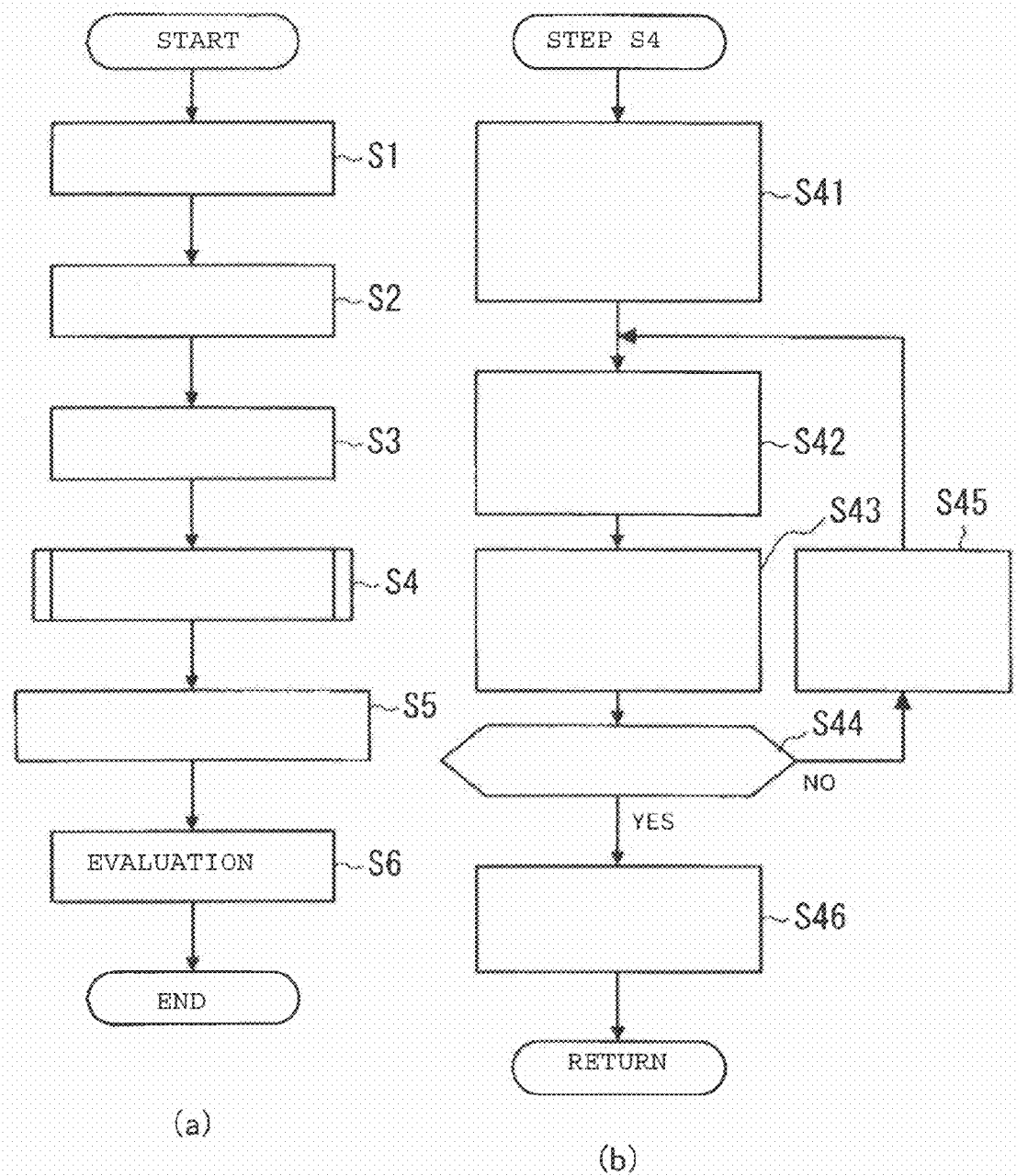
FIGS. 3(a) and 3(b): Flowcharts showing an embodiment of an inspection method according to the present invention.
Figure 4:
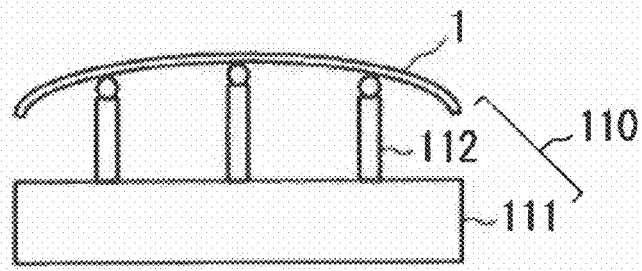
FIGS. 4(a) to 4(c): Schematic views illustrating an inspection sequence.
Figure 4:
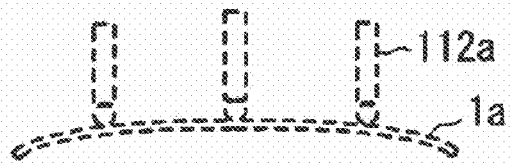
Figure 4:
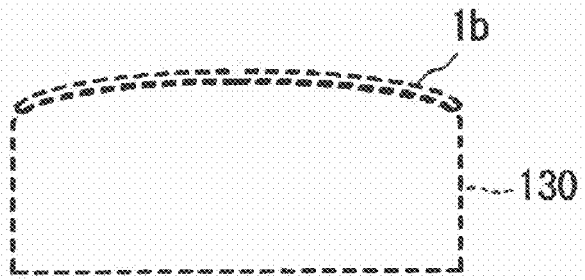

FIG. 3 is a flowchart showing an embodiment of the inspection method according to the present invention. FIGS. 4(*a*) to 4(*c*) are views for explaining the inspection procedure. First of all, on the inspection stand 110 in FIG. 1, an object 1 to be measured is placed manually or by employing a robot (not shown) (step S1, FIG. 4(*a*)). Consequently, an image of the top surface of the object 1 is captured by the camera 121, and the captured image is retrieved by the computer 120 (step S2), then, the computer 120 carries out image processing to extract e.g. the outline and slope on the surface of the object 1, calculates three-dimensional shape of the object 1, and finite element mesh is produced by a known method (step S3). Detail of calculating the shape is to be described later.

Subsequently, based on the calculated shape of the object 1, a three dimensional shape 1*a* in a weightless state is calculated by a simulation (step S4, FIG. 4(*b*)). Here, since the shape of the object 1 is slightly deflected due to the influence of gravity and the deflection changes depending on the number and positions of supporting points, it is not proper to carry out a second stage simulation (step S5) based on the calculated shape. Thus, in the present invention, the shape 1*a* (particularly, the shape in a weightless state) of the object 1 before it is placed on the inspection stand, is simulated, and the shape 1*a* is used for further processing. Detail of calculation of the shape is to be described later.

Then, based on the calculated shape 1*a* in a weightless state, a shape 1*b* of the object in a state that it is placed on a specific inspection stand 130 (which correspond to the predetermined inspection stand in the Claims) is recalculated (step S5), and the quality of the shape is evaluated (step S6, FIG. 4(c)). The evaluation is carried out under assumption that the object is placed on the specific inspection stand 130, the distances from a placing surface of the inspection stand 130 to the backside of the shape 1b of the object 1 calculated in step S5 are calculated at positions of a plurality of distance sensors provided on the placing surface.

Thus, in the present invention, by obtaining the shape data 1b of the object in a state that it is placed on a predetermined inspection stand 130 based on a shape data of the object in a state that it is placed on a generic inspection stand 110, which provides an excellent effect that it is not necessary to prepare an inspection stand for each model of product. Further, instead of the step S5, the quality of the object 1 may be judged based on a comparison of the shape data 1a of the object 1 in a weightless state calculated in the step S3 with a predetermined design shape data (CAD data) of the object 1. The comparison is carried out such that under the condition that the coordinates of the shape data 1a of the object 1 in a weightless state and its design shape data agree with each other at least three points among points at which the object 1 is supported on the predetermined inspection stand 130, the positions of a plurality of distance sensors provided on a placing surface of the predetermined inspection stand 130, namely, at the predetermined evaluation points, the differences between the shape data 1a of the object 1 in a weightless state and the design shape data, are calculated, and an evaluation is made based on whether or not the differences are within a predetermined range. The evaluation is suitable in a case where the object 1 has a shape and position not to be deformed by gravity, since it is possible to reduce calculation amount of the computer 120.

Here, there are several methods of calculating the three-dimensional shape 1a in a weightless state in the step S4, and for example, the following method can be used. First of all, a shape is simulated which produced by applying a force having the same strength and opposite direction from the gravity to the three-dimensional shape measured in step S1, to simulate the shape in which the effect of gravity is removed (the shape in a weightless state), and the shape obtained is memorized as "initial shape" (step S41). At this time, since it is necessary to support a glass sheet so that the glass sheet is not moved by a force applied, the glass sheet is supported downwardly at the three positions (which corresponds to imaginary rods 121a of FIG. 4(b)) on the upper surface of the glass sheet corresponding to the above-mentioned three supporting positions.

Subsequently, a state in which the glass sheet of "initial state" is placed on an inspection stand of three-point supporting, is simulated by a computer simulation (step S42). Then, the simulated shape and the three-dimensional shape data obtained by actual measurement in step S3 are compared (step S43), and if the positions of nodes in their meshes agree with each other, the shape of the simulated shape of weightless state is judged to be appropriate.

Here, since there are some difference between them in most cases, a displacement at each node of the meshes used in the simulation is checked and when the average of the displacements at the nodes is at least a predetermined value (step S44), the "initial shape" is deformed so as to clear the displacement (step S45), and the same process is carried out again in step S42. Of course, the judgment may be based on whether or not the maximum value of the displacement exceeds a predetermined value, or whether or not the minimum value of displacement is less than a predetermined value, or the judgment may be based on displacement(s) of predetermined node(s) selected in advance. Thereafter, steps S42 to S45 are repeated until the judgment result in step S44 is converged, and if the displacements in the nodes converge within a predetermined displacement range, the "initial shape" at this time is determined as a "three dimensional shape in a weightless state" (step S46). The displacement range is appropriately selected according to e.g. the shape or the size of product or a requirement value of standards such as JIS (Japan Industrial Standards).

Figure 5:
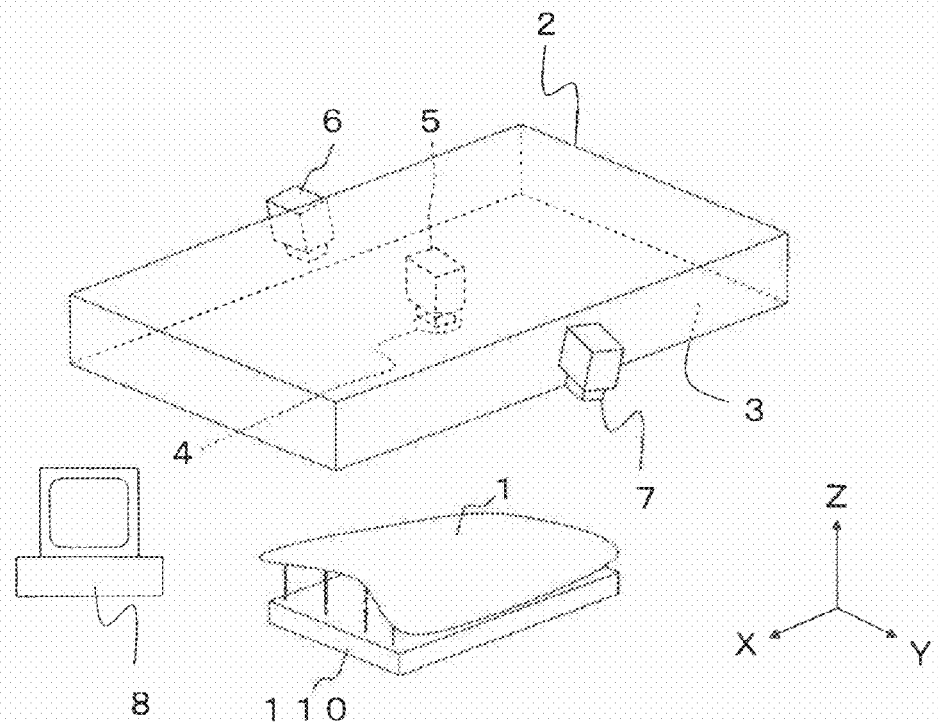
FIG. 5: An explanation view showing an embodiment of a shape measurement system according to the present invention.

Then, detail of the method of measuring surface shape of an object to be measured by image capturing, is described. FIG. 5 is an explanation view showing the basic construction of a shape inspection apparatus. As shown in the figure, a plane light source 2 is disposed above an object 1 to be measured having a mirror surface such as a glass for automobiles. A color pattern 3 is attached on an emission surface of the plane light source 2. In order to capture a reflection image of the color pattern 3 projected on the object 1, one main camera and at least one sub color camera are disposed. These color cameras correspond to a camera 121 of FIG. 1. The number of color cameras is not limited but a main color camera 5 and a sub color cameras 6 and 7, namely total three color cameras, are employed in this example. The main camera 5 is disposed inside the plane light source 2, to capture a reflection image of the color pattern 3 projected on the object 1 to be measured through a hole 4 opening in the color pattern 3. The sub color cameras 6 and 7 are disposed outside the plane light source 2, to capture images reflected by the object 1. A computer 8 such as a personal computer is connected with the color cameras 5, 6 and 7 and analyzes reflected images captured by these cameras by a known image processing technique to obtain the shape of the object 1. The optical system and the object to be measured are assumed to be placed in an XYZ coordinate system wherein Z axis is in the vertical direction. Sides of the plane light source 2 are assumed to be parallel with X axis and Y axis respectively. From now, the XYZ coordinate system for describing the arrangement of the entire optical system is called as a global coordinate system and coordinates in the global coordinate system are called as global coordinates.

As the plane light source 2, one having a plurality of fluorescent lamps arranged in a casing, whose emission surface is covered by a glass sheet, is employed. As the color pattern 3 pasted to the emission plane, a transparent or light-scattering resin film having a color pattern printed (by e.g. inkjet printing) thereon, may be employed. The color pattern 3 may be pasted on a surface of single cover glass or may be sandwiched by two cover glasses. The brightness of the plane light source 2 is preferably as uniform as possible, and for this purpose, arrangement of the fluorescent lamps in the casing is deviced. Further, the resin film to be used as the color pattern is preferably made of not a transparent material but a light-diffusion-transmitting material. By such a material, unevenness of brightness of the plane light source 2 is reduced. The color cameras 5, 6 and 7 are not particularly limited so long as they are of area camera types.

Figure 6:
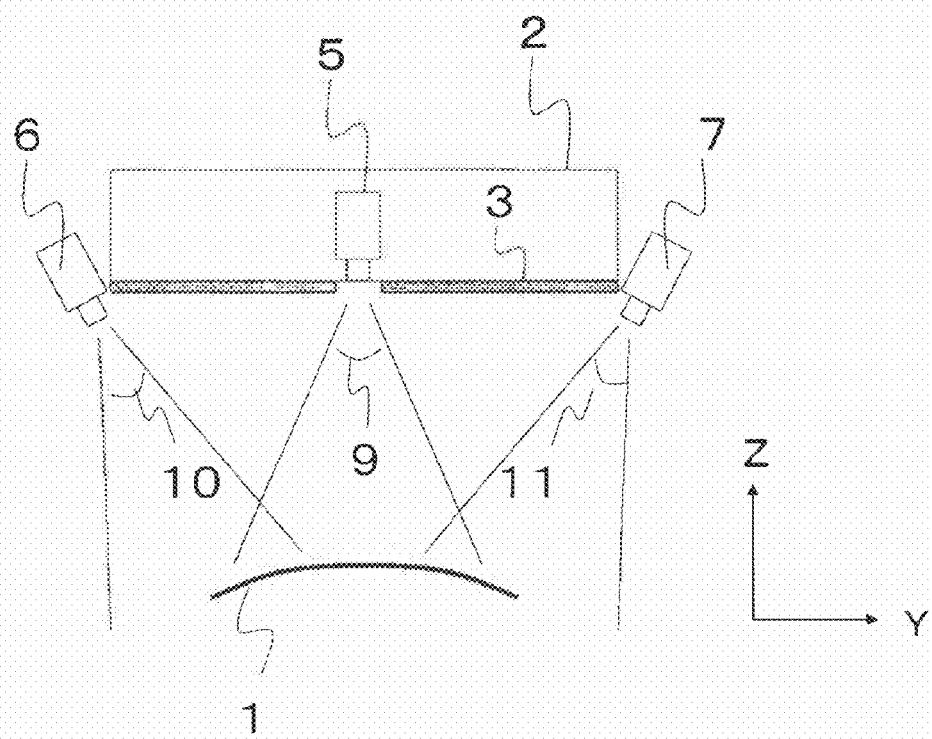
FIG. 6: A cross-sectional view showing an optical system for shape measurement.

FIG. 6 is a partial cross-sectional side view of the optical system by YZ plane, showing the relation of positions and view fields of three color cameras. The direction of the main color camera 5 is vertically downward direction and captures a reflection image in the range of a view field 9. The sub color camera 6 captures a reflection image in the range of a view field 10, and is positioned so that a part of the view field 10 overlaps a part of the view field 9 in the object 1. In the same manner, the sub color camera 7 captures a reflection image in the range of a view field 11, and is positioned so that a part of the view field 11 overlaps a part of the view field 9 on the object 1. These three color cameras are fixed in the global coordinate system, and their positions and directions can be obtained as known information.

Figure 7:
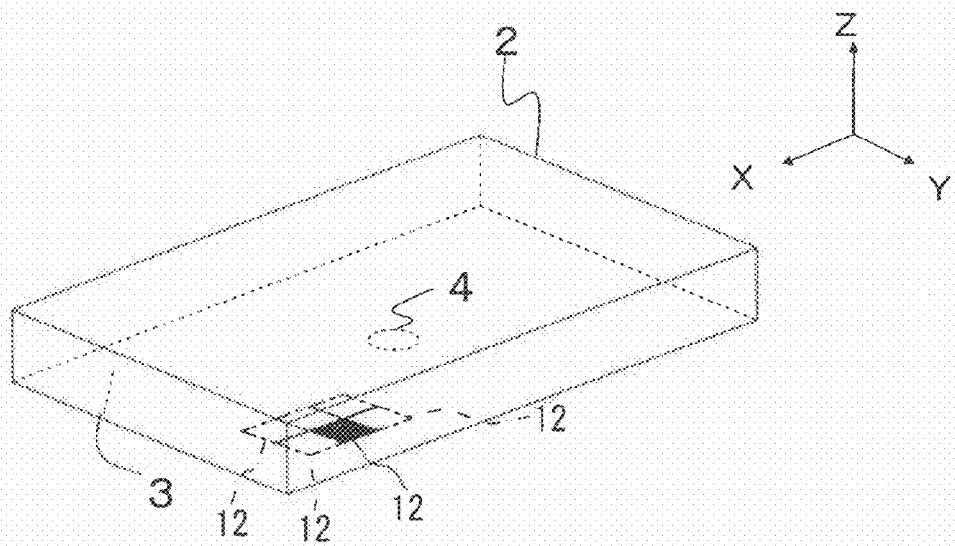
FIG. 7: An explanation view schematically showing a color pattern.

FIG. 7 is an explanation view of the color pattern 3. The color pattern 3 is constituted by a plurality of basic patterns 12 each being a element that are densely arranged so as not to overlap with each other. Accordingly, in the color pattern 3, the basic pattern 12 appears periodically in both vertical and lateral directions.

Figure 8:
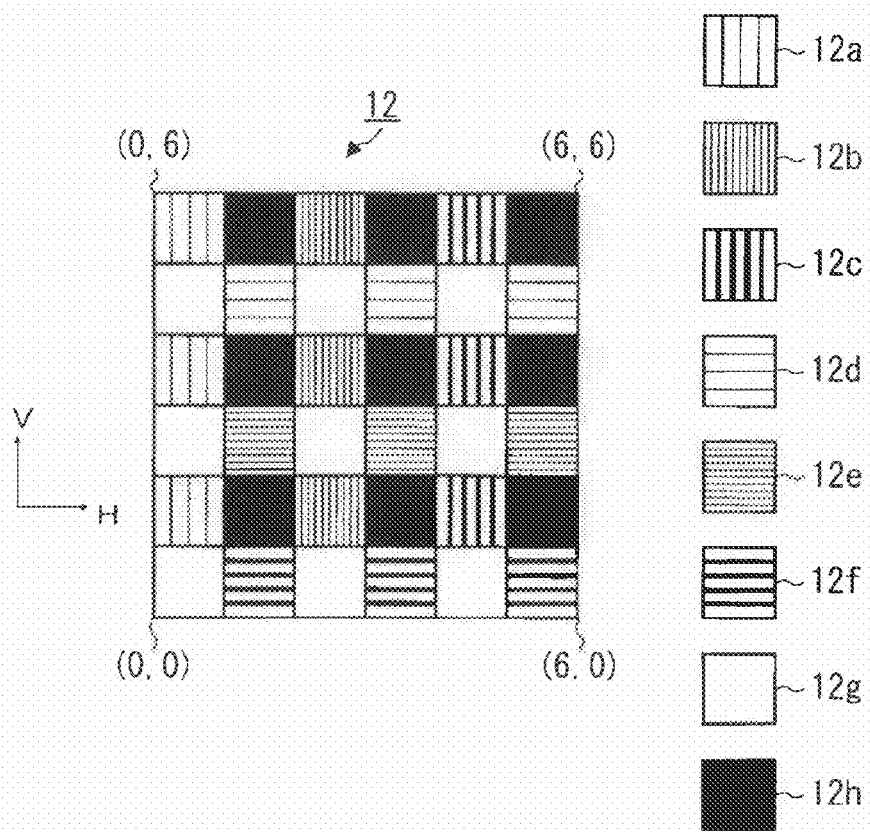
FIG. 8: A plan view showing a basic pattern.

FIG. 8 is a detailed explanation view of the basic pattern 12. The basic pattern 12 is constituted by 6×6 of fine square patterns, and each of the fine square patterns has any one of eight colors 12a to 12h. Further, as shown in FIG. 8, each basic pattern 12 has a local coordinate system having lateral and vertical directions. From now, coordinates of a point in a basic pattern 12 are called as local coordinates. In the case of basic pattern shown in FIG. 8, components of the local coordinates each takes a non-dimensional value of from 0 to 6. By these local coordinates, the position of optional point in the basic pattern 12 can be described. For example, in the basic pattern 12 of FIG. 8, a lower left point is described as (0,0), the center point is described as (3,3) and the upper right point is described as (6,6). Each component of local coordinate is not limited to an integer but the local coordinate can be described as e.g. (2.5,3.3). From now, the position of a point in a basic pattern 12 is called as local coordinate.

Eight colors constituting the basic pattern 12 are adjusted as follows in advance.

Figure 9:
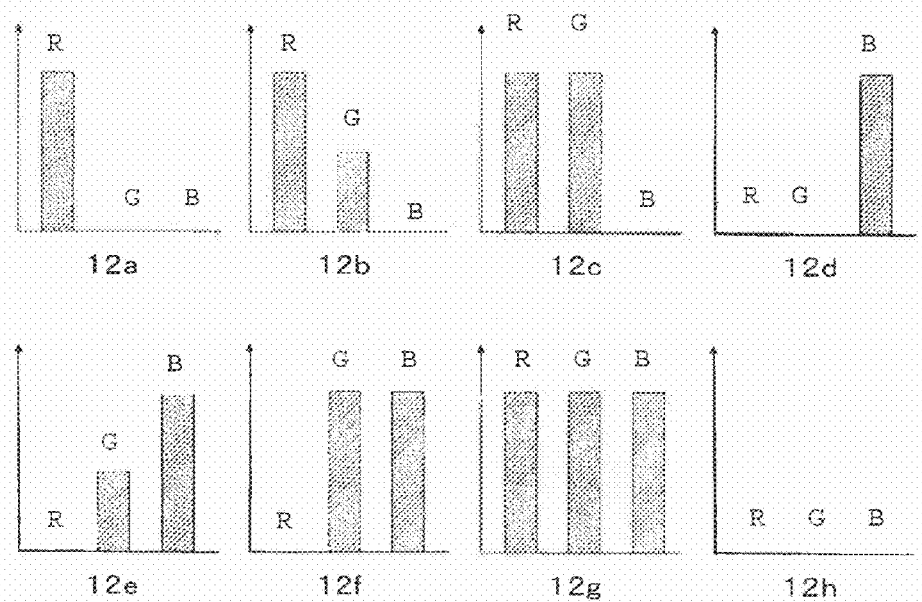
FIG. 9: Graphs showing intensities of a red component, a green component and a blue component of each of eight colors constituting the basic pattern captured by a color camera.

FIG. 9 shows a red component, a green component and a blue component of an image of each of eight colors constituting the basic pattern captured by a color camera. The vertical axis of each graph shows the intensity of the color components. Colors 12a, 12b and 12c are adjusted so as not to contain blue component and have red components of the same intensity. The difference among the colors 12a, 12b and 12c resides in the intensity of green component. In the same manner, colors 12d, 12e and 12f are adjusted so as not to contain red component and have blue component of the same intensity. The difference among the colors 12d, 12e and 12f resides in the intensity of green components. A color 12g has a red, green and blue components having the same strength, and a color 12h has red, green and blue components of no intensity. Here, the intensities of red and blue components of the color 12g are the same as those of red components of the colors 12a, 12b and 12c and the same as blue components of the colors 12d, 12e and 12f.

Figure 10:
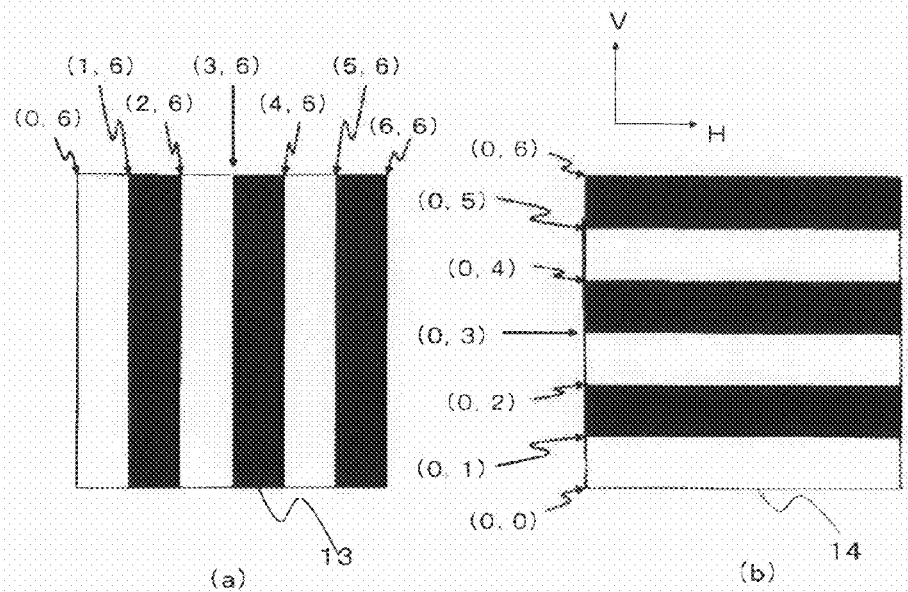
FIG. 10(a): A plan view showing a stripe pattern appeared when the red component is observed.
FIG. 10(b): A plan view showing a stripe pattern appeared when the blue component is observed.

By adjusting the eight colors constituting the basic pattern 12 as described above, it is possible to contain two perpendicular stripe patterns in the basic pattern 12. When the image of the basic pattern 12 is captured by a color camera and observed only its red component, a stripe pattern 13 appears as shown in FIG. 10(a). In the same manner, when only its blue component is observed, a stripe pattern 14 appears as shown in FIG. 10(b). Thus, according to this embodiment, although a single color pattern is used, it is possible to obtain two perpendicular stripe patterns by observing different color components. As evident also from FIG. 10, the stripe pattern 13 corresponds to the local coordinate in H direction and the stripe pattern 14 corresponds to the local coordinate in V direction. Here, the stripe patterns 13 and 14 preferably perpendicular to each other but they may be at another angle and the angle may be any angle so long as the directions are not parallel with each other.

Then, the principle of shape measurement of the present invention is described.

Figure 11:
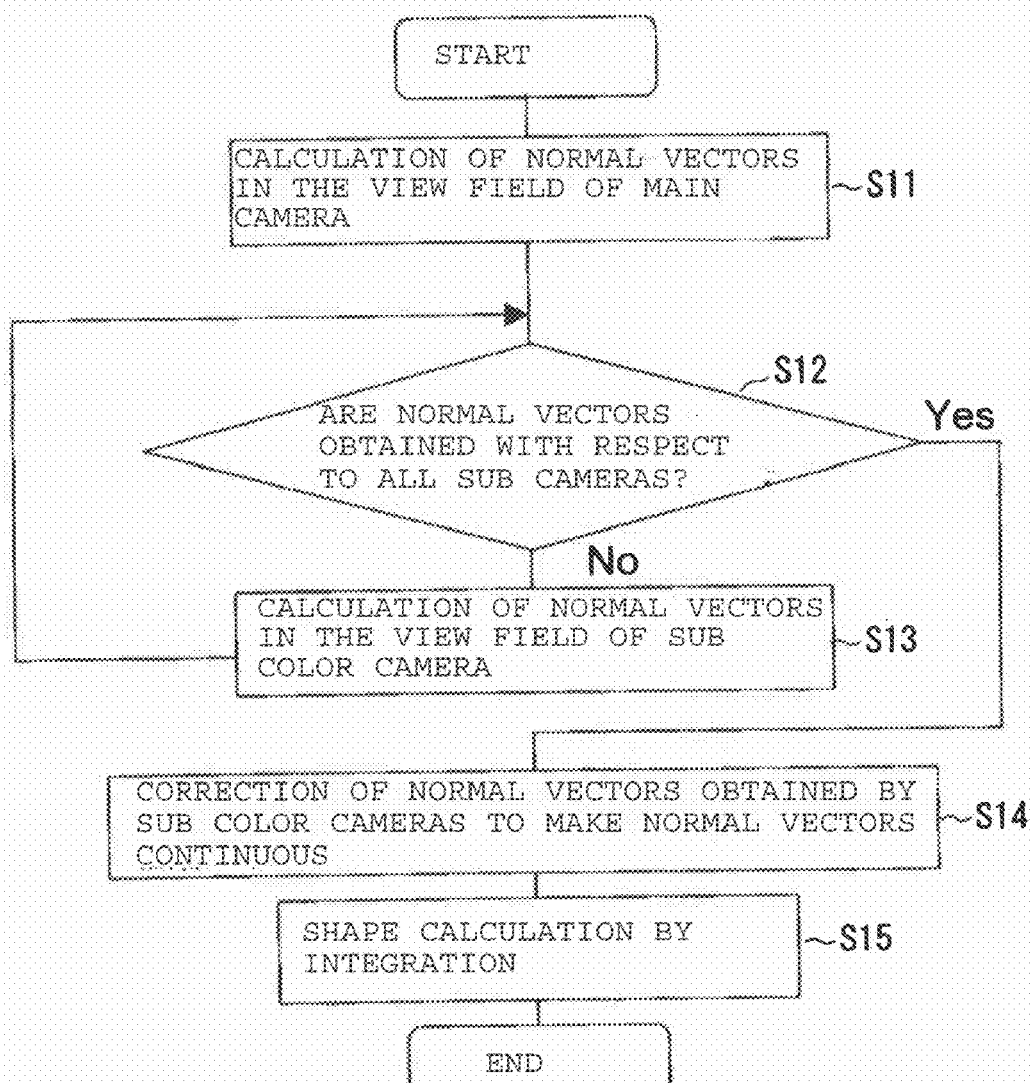
FIG. 11: A flowchart showing an embodiment of the shape measurement.

FIG. 11 is a flowchart showing an embodiment of the shape measurement. As shown in the figure, based on the law of regular reflection, a normal vector at each of previously determined sampling points on an object to be measured is obtained, and finally carrying out an integration calculation to obtain the shape of the object to be measured. First of all, normal vectors at sapling points in the view field of a main color camera are obtained, and subsequently, normal vectors at sampling points in the view fields of sub color cameras are obtained (step S11, S12 and S13). Further, the normal vectors obtained by the sub color cameras, are modified so as to have continuity to the normal vectors obtained by the main color camera (step S14). Finally, inclination of planes obtained by the normal vectors are integrated to obtain the shape of the object to be measured (step S15). With respect to the specific method of the integration calculation, a known method such as one disclosed in JP-A-2005-345383 or JP-A-11-211440 may be applied.

Figure 12:
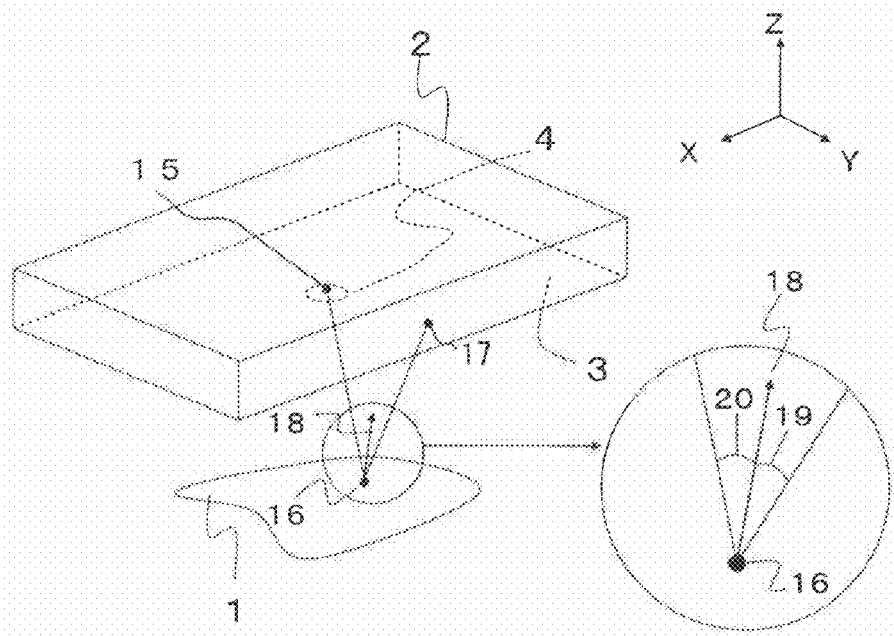
FIG. 12: An explanation view showing the method of obtaining a normal vector.

FIG. 12 shows the method of obtaining a normal vector at a sampling point. Here, a concept of obtaining a normal vector by using a main color camera 5 is described. It is assumed that when the image of a sampling point 16 on an object 1 to be measured is captured by a color camera (not shown) located at a viewpoint 15, a reflection image of a reference point 17 is on the color pattern 3. Here, a method for obtaining a normal vector 18 at the sampling point 16 is considered. When a reflection image of the reference point 17 is projected at the sampling point 16, light from the reference point 17 is reflected at the sampling point 16 on the object 1, and reaches the viewpoint 15 of the color camera. According to the law of regular reflection, the incident angle 19 and reflection angle 20 are equal at the sampling point 16. Accordingly, when the global coordinates of the viewpoint 15, the reflection point 16 and the reference point 17 are known, the normal vector 18 can be identified.

As described above, to calculate the normal vector 18, it is necessary to identify global coordinates of the viewpoint 15, the sampling point 16 and the reference point 17, and these information can be categorized into known information and unknown information as follows. First of all, since the color camera 5 is fixed, its viewpoint 15 is known information. The sampling point 16 is a point on the object 1 whose shape has not been obtained yet, and thus, it is unknown information. However, in a case of a glass for automobiles, the sampling point 16 can be approximated from its design shape. Since the position of the glass for automobiles at a time of measurement is known, the sampling point 16 can be handled as known information. On the other hand, the reference point 17 changes depending on the actual shape of the object 1, and thus, it is necessary to obtain the position of the reference point 17 each time the object 1 changes. Since the position of the color pattern 3 is fixed, Z component of the global coordinates of the reference point 17 is known information, but XY components are unknown information. In summary, among information required to obtain the normal vector 18, unknown information is only XY components of the global coordinates of the reference point 17, and obtaining these information is the main purpose of analyzation of reflection image.

Figure 13:
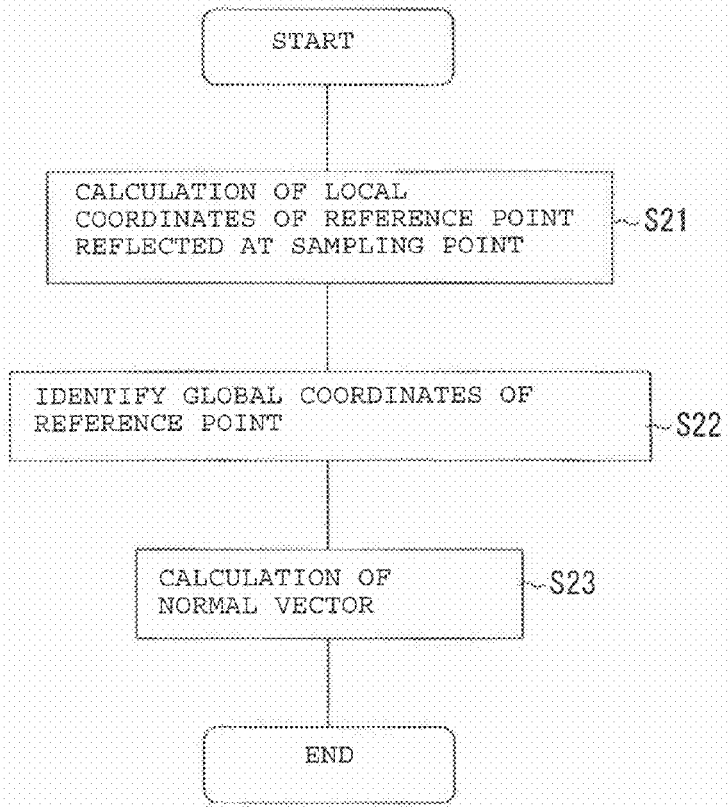
FIG. 13: A flowchart showing a procedure for obtaining a normal vector at a sampling point from a reflection image.

FIG. 13 is a flowchart showing the procedure of calculating a normal vector at a sampling point. First of all, a reflection image in the vicinity of the sampling point is observed and local coordinates of a reference point projected on the sampling point is obtained (step S21). Subsequently, local coordinates and restriction conditions to be described later, global coordinates of the reference point are identified (step S22). Finally, by using the law of regular reflection, the normal vector at the sampling point is calculated (step S23).

Here, the method of calculating local coordinates of the reference point being the first step of the flowchart of FIG. 13, is described. As shown in FIG. 8, the color pattern 3 is constituted by periodically repeated basic patterns 12. Accordingly, any reference point in inevitably located in some position in a basic pattern 12, and its local coordinates can be obtained.

Figure 14:
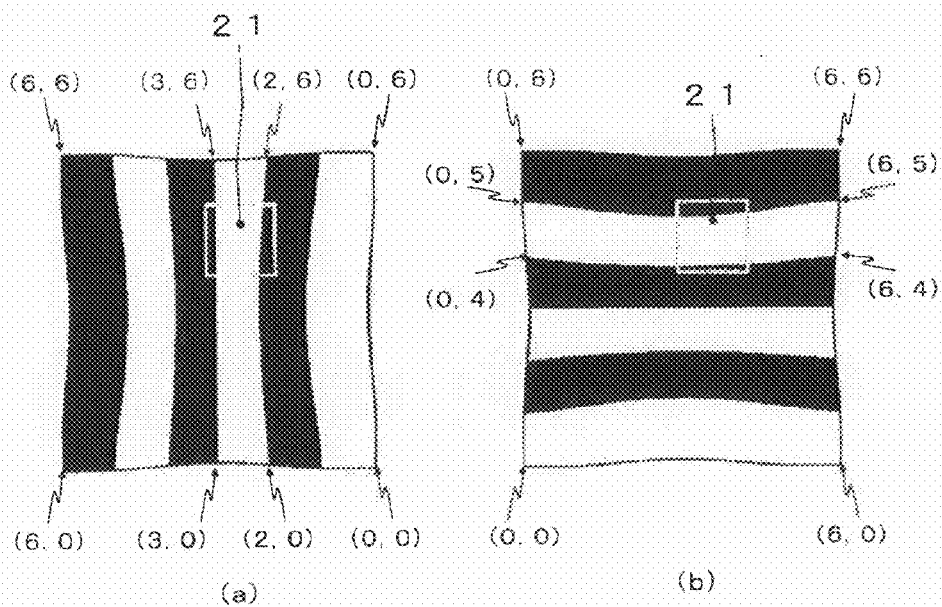
FIGS. 14(a) and 14(b): Plan views showing reflected images of a basic pattern projected in the vicinity of sampling point.

FIGS. 14(*a*) and 14(*b*) show a reflection image of a basic pattern 12 projected in the vicinity of the sampling point 16. FIG. 14(*a*) corresponds to a red component of the reflection image and FIG. 14(*b*) corresponds to a blue component of the reflection image. Here, since FIG. 14 shows a mirror image, it is noted that left-right directions are opposite between FIG. 14(*a*) and FIG. 10(*a*). Further, since a glass for automobiles has a curved surface, a distorted pattern as shown in FIG. 14 is usually captured. A point 21 is an image of the sampling point 16 captured by the color camera 5. In this embodiment, by analyzing a reflection image in the vicinity of the point 21, local coordinates of the reference point 17 are obtained.

In FIG. 14, there are three important information for obtaining local coordinates. They are:

Information 1: Whether the point 21 is located in a white region or a black region in a stripe pattern, Information 2: The intensity of green component of a color image of the white region (except the region of color 12*g* in FIG. 8) in the stripe pattern in the vicinity of the point, and Information 3: The length from the point 21 to stripe boarders sandwiching the point 21.

Figure 15:
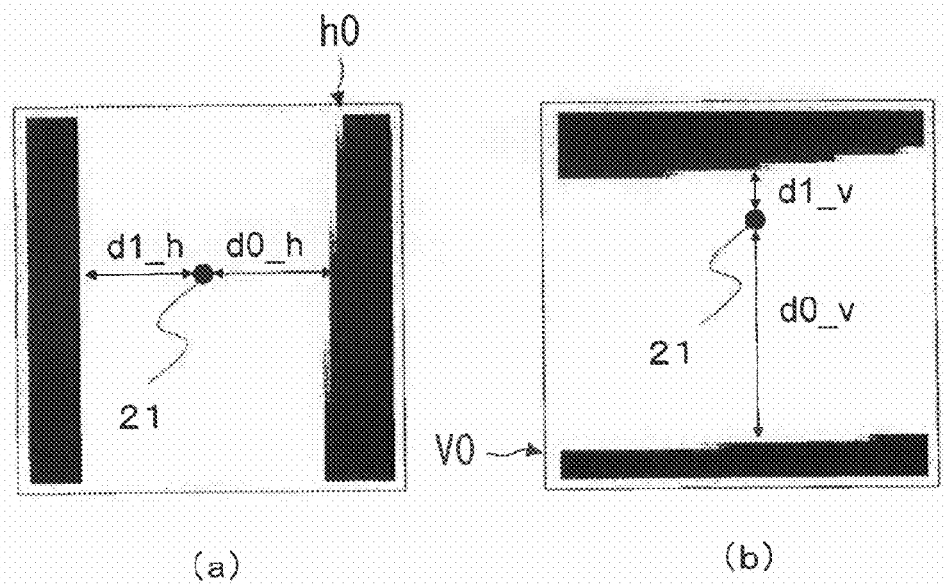
FIGS. 15(a) and 15(b): Enlarged plan views of a part of reflection images of a basic pattern projected in the vicinity of sampling point.

FIG. 15 shows a further enlarged image in the vicinity of the point 21 of FIG. 14. FIG. 15(*a*) corresponds to a red component of the reflection image, and FIG. 15(*b*) corresponds to a blue component of the reflection image. In FIG. 15(*a*), the lengths from the point 21 to stripe boarders are assumed to be d0_h, d1_h. Here, the length to a stripe boarder at which the local coordinate in a horizontal direction is smaller is designated as d0_h, and smaller local coordinates of two boarders in the horizontal direction is designated as h0. In the same manner, in FIG. 15(*b*), the lengths from the point 21 to stripe boarders are designated as d0_v, d1_v. In the same manner as above, the length to a boarder at which the local coordinates in the vertical direction is smaller is designated as d0_v, and smaller local coordinates of two boarders in the vertical direction is designated as v0. Here, the local coordinates of the point 21 is given by the formulas (1) and (2).

(Horizontal local coordinate component of point 21)=$d0\_h/(d0\_h+d1\_h)+h0$     (1)

(Vertical local coordinate component of point 21)=$d0\_v/(d0\_v+d1\_v)+v0$     (2)

In order to correctly obtain h0 or v0, in this embodiment, among the above three informations, h0 or v0 is correctly obtained by using the informations 1 and 2. For example, a case of identifying h0 is considered. In this case, if the point 21 is located in a white region in FIG. 14(*a*), candidates of h0 is limited to 0, 2 and 4. If the point 21 is in a black region, the candidate of h0 is limited to 1, 3 and 5. Further, by checking a green component of a color image of a white region (except for a region of color 12*g* in FIG. 8) in the vicinity of point 21 in FIG. 14(*a*), one out of three candidates of h0 may be selected.

As described above, by checking a reflection image projected in the vicinity of a sampling point, it is possible to obtain local coordinates of a reference point. However, since a plurality of the basic pattern 12 are periodically arranged in a color pattern, even if local coordinates of the reference point are identified, its global coordinates are not identified. The global coordinates of the reference point are identified by is adding restriction conditions to the information of the local coordinates obtained by the above method. There are three types of concepts of the restriction conditions depending on the situation, they are described below. Table 1 shows the three types of restriction conditions.

TABLE 1

| Type of sampling point | Restriction condition |
| --- | --- |
| Sampling point to obtain a first normal vector in the view field of main color camera | Basic point whose global coordinates are known |
| Sampling point in the vicinity of another sampling point at which reference point projected thereon is identified | Reference point reflected at another sampling point in the vicinity |
| Sampling point in the view field of sub color camera at which normal vector is already identified by information from another camera | Reference point predictable from already identified normal vector |

A first restriction condition is described.

Figure 16:
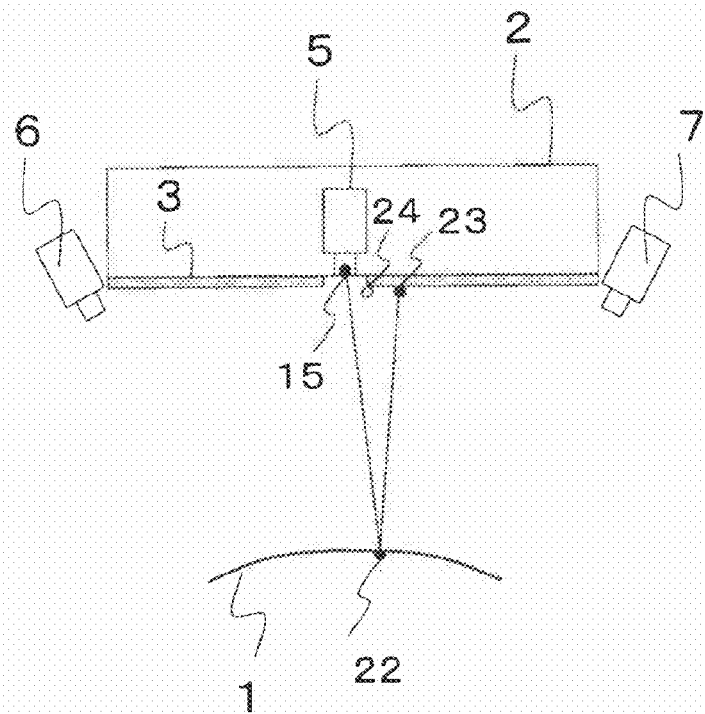
FIG. 16: An explanation view showing forming of a reflection image.

FIG. 16 shows a state that a reflection image of a reference point 23 is projected on a sampling point 22 when a color camera 5 captures an image of the sampling point 22. Here, the sampling point 22 is assumed to be a first sampling point to obtain a normal vector among sampling points present in the image field of the color camera 5. In FIG. 16, global coordinates of a basic point 24 on the color pattern 3 are assumed to be known. The basic point 24 preferably has remarkable characteristic enabling to easily distinguish the point from other points in the color pattern 3. For example, the basic point 24 may be a point in the vicinity of a hole 4 (refer to FIG. 5) opening in the color pattern 3. Alternatively, the basic point 24 may be a center point of a section in a basic pattern, that is colored with a color other than the eight colors shown in FIG. 8. By selecting a sampling point 22 so that the reference point 23 becomes as close to the basic point 24 as possible, the global coordinates of the reference point 23 can be correctly identified from their positional relation with those of the reference point 24.

Selection of the sampling point 22 is carried out by a computer simulation. Assuming that an object 1 to be measured has a designed shape, the position of a reference point in relation to each sampling point is predicted by a light path tracking among these sampling points, a sampling point whereby a reference point becomes closest to the basic point 24, is designated as the sampling point 22. As described above, in this embodiment, with respect to a first sampling point to calculate a normal vector, a normal vector is calculated by using a basic point whose global coordinates are known as restriction conditions.

Then, a second restriction condition is described.

Figure 17:
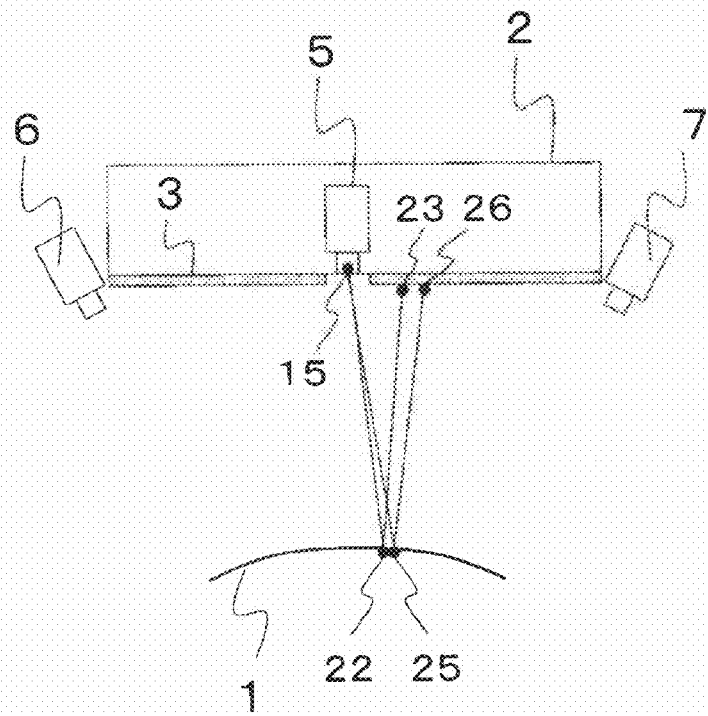
FIG. 17: An explanation view showing forming of a reflection image.

FIG. 17 shows a state that a reflection image of a reference point 26 is projected on a sampling point 25 when a color camera 5 captures the image of the sampling point 25. Here, the sampling point is assumed to be a point present in the vicinity of the first sampling point 22 to obtain the normal vector in FIG. 16. The global coordinates of the reference point 23 projected on the sampling point 22 have already been known from the above-mentioned method. In order to identify global coordinates of the reference point 26, it is considered to use the reference point 23 as a new restriction point. By making the interval between sampling points sufficiently small, a distance between two reference points projected on two sampling points close to each other can be made the size of a basic pattern 12 or smaller. Here, among points having the same local coordinates as those of the reference point 26, a point closest to the reference point 23 may be designated as a true reference point 26. Thus, by using the position of a sampling point projected on a close-by sampling point, a normal vector is calculated. By using the sampling point 22 as a start point and propagating the same calculation to its surroundings, it is possible to calculate normal vectors at sampling points in the view field of the color camera 5.

Finally, a third restriction condition is described.

Figure 18:
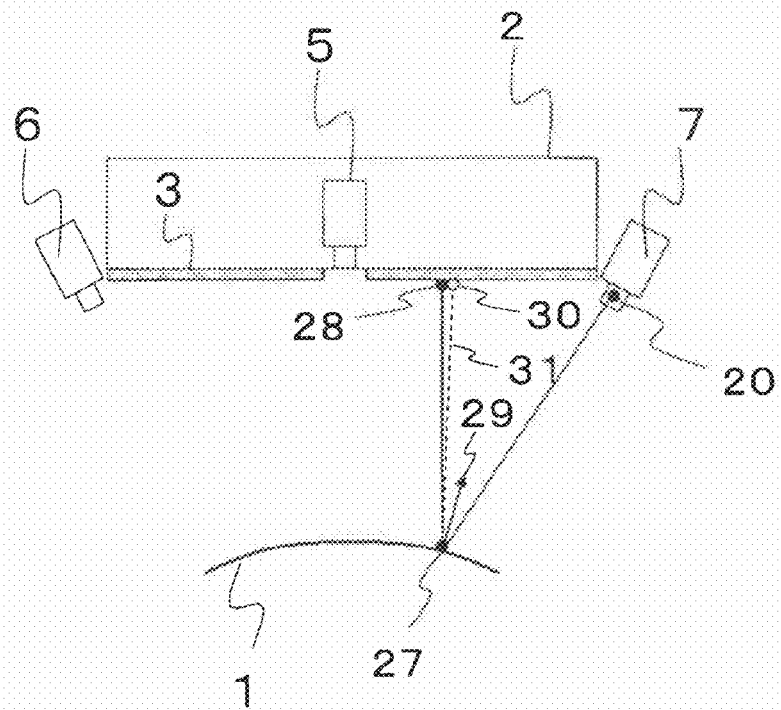
FIG. 18: An explanation view showing forming of a reflection image.

FIG. 18 shows a state that a reflection image of a reference point 28 is projected on a sampling point 27 when a color camera 7 captures an image of the sampling point 27. Here, the sampling point 27 is assumed to be present in a region where the view fields of the color cameras 5 and 7 overlap. Since the sampling point 27 is in the image field of the color camera 5, by using a process explained with reference to FIGS. 16 and 17, a normal vector 29 has already been obtained. Now, it is considered to calculate a normal vector at the sampling point 27 again by using the reflection image captured by the color camera 7. For this calculation, global coordinates of the reference point 28 are necessary, and to calculate the global coordinates of the reference point 28, known normal vector 29 is used in this embodiment.

In FIG. 18, a predicted reference point 30 is a predicted position of a reference point captured by the color camera 7 when a normal vector at the sampling point 27 is equal to the known normal vector 29. A light path 31 is calculated according to a law of regular reflection, and an intersection point of the light path 31 and the color pattern 3 becomes the predicted reference point 30. When the positions and directions of the color cameras 5 and 7 are correctly identified, a point closest to the predicted reference point 30 among points having the same local coordinates as those of the reference point 28, can be regarded as a true reference point 28. As a result, it is possible to obtain a normal vector at the sampling point 28 based on a viewpoint information of the color camera 7. Thereafter, using the sampling point 27 as a start point, normal vectors at other sampling points in the view field of the color camera 7 can be obtained. At this time, the above-mentioned second restriction condition may be applied.

As shown in FIG. 18, when a sampling point is in view fields of a plurality of color cameras, a normal vector is obtained from an image captured by each of the color cameras in this embodiment. To obtain a normal vector, global coordinates of a viewpoint of color camera, a sampling point and a reference point are necessary, but in an actual measurement, these include errors, and thus, normal vectors obtained based on images captured by the respective color cameras are not exactly the same.

Figure 19:
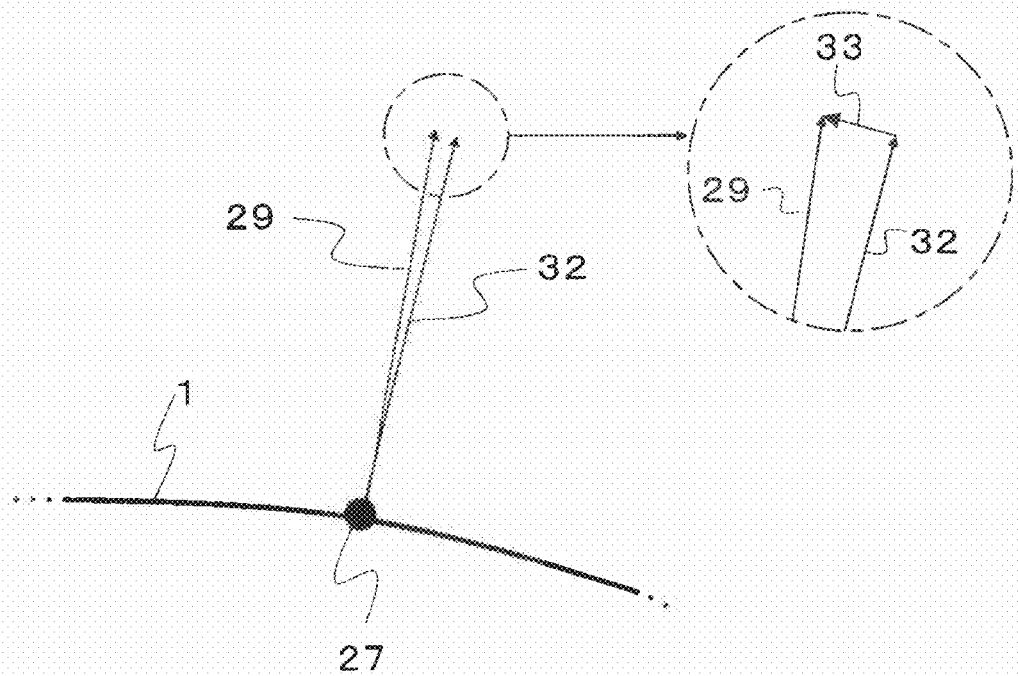
FIG. 19: An explanation view showing a correction vector used for correcting a nominal vector.

FIG. 19 is an enlarged view in the vicinity of the sampling point 27 in FIG. 18. The normal vector 29 is a normal vector at the sampling point 27 obtained from the image captured by the color camera 5, and a normal vector 32 is a normal vector at the sampling point 27 obtained from an image captured by the color camera 7. Since a normal vector at the sampling point 27 is unique, in this embodiment, a correction vector 33 given as the difference between the normal vector 29 and the normal vector 32, is obtained to correct the normal vector obtained from an image captured by the color camera 7. Namely, a vector produced by adding the correction vector 33 to the normal vector obtained from an image captured by the color camera 7, is designated as a correct normal vector. The correction vector is applied not only to sampling points in a region in which the image fields of color cameras 5 and 7 overlap, but also to all sampling points in the view field of the color camera 7. By the above-mentioned correction process, a continuous normal vector distribution is formed over the sampling point in the view fields of color cameras 5 and 7.

Further, for the correction of errors of normal vectors, the following method is also applicable, and the method is described with reference to FIG. 18. A reference point 28 is a point projected on a sampling point 27 when the color camera 7 captures an image of the sampling point 27. A predicted reference point 30 is a predicted position of a reference point captured by the color camera 7 assuming that a normal vector at the sampling point 27 is equal to a known normal vector 29. Here, a point closest to the predicted reference point 30 among points having the same local coordinates as those of the reference point 28, is designated as the true reference point 28, and the difference between the reference point 28 and the predicted reference point 30 is obtained. The difference between the reference point and the predicted reference point is obtained at every point in a region where the image fields of color cameras 5 and 7 overlap. A coordinate conversion is made so that the difference between the reference point and the predicted reference point disappears at all points. The coordinate conversion is applied not only to sampling points in the region where the view fields of color cameras 5 and 7 overlap, but also to all sampling points in the view field of the color camera 7. By thus making a coordinate conversion, a normal vector at a sampling point obtained from an image captured by the color camera 5, agrees with a normal vector at a sampling point obtained from an image captured by the color camera 7. By the above correction process, a continuous normal vector distribution is formed over sampling points in the view fields of the color cameras 5 and 7.

With respect to the color camera 6, calculation and correction of normal vectors are carried out in the same manner as the color camera 7. By this method, normal vectors at all sampling points produced on the object 1 to be measured, are obtained, and these normal vectors form a continuous distribution. By integrating an inclination of surface obtained by each normal vector, the shape of the object 1 is obtained.

Figure 20:
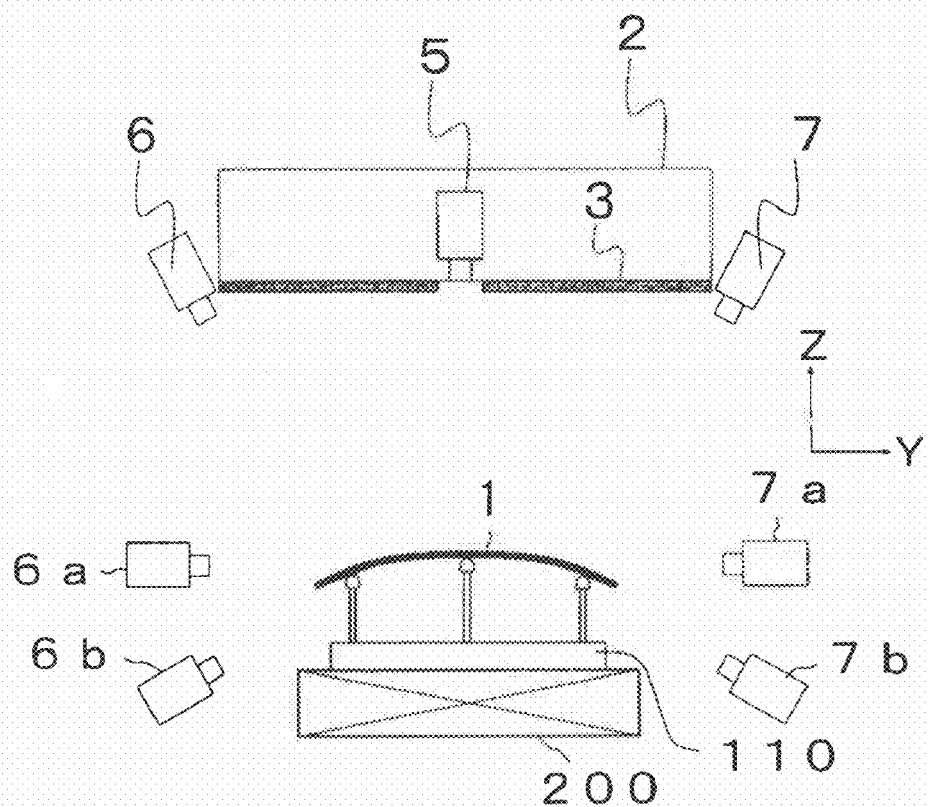
FIG. 20: An explanation view showing another embodiment of the present invention.

Here, in the above, explanation is made with respect to an inspection of the object 1 in a state that the object is stationary on an inspection stand 110, but the present invention is not limited thereto. For example, as shown in FIG. 20, the construction may be such that an inspection stand 110 is placed on a conveying means such as a belt conveyor, and an image of an object 1 to be measured, conveyed together with the inspection stand 110 is captured and inspected. In this case, sub cameras 6a, 6b, 7a and 7b may be disposed at both sides of the object 1 at appropriate tilting angles, whereby even an image of an object (e.g. a rear glass for automobiles) having a large curvature can be easily captured and its inspection becomes possible.

Then, another embodiment of the present invention is described. Explanation of a construction for obtaining surface shape information of a glass sheet is omitted since it is the same as that of FIGS. 1 and 2 of the above-mentioned embodiment, and explanation is made only to inspection procedure.

Figure 21:
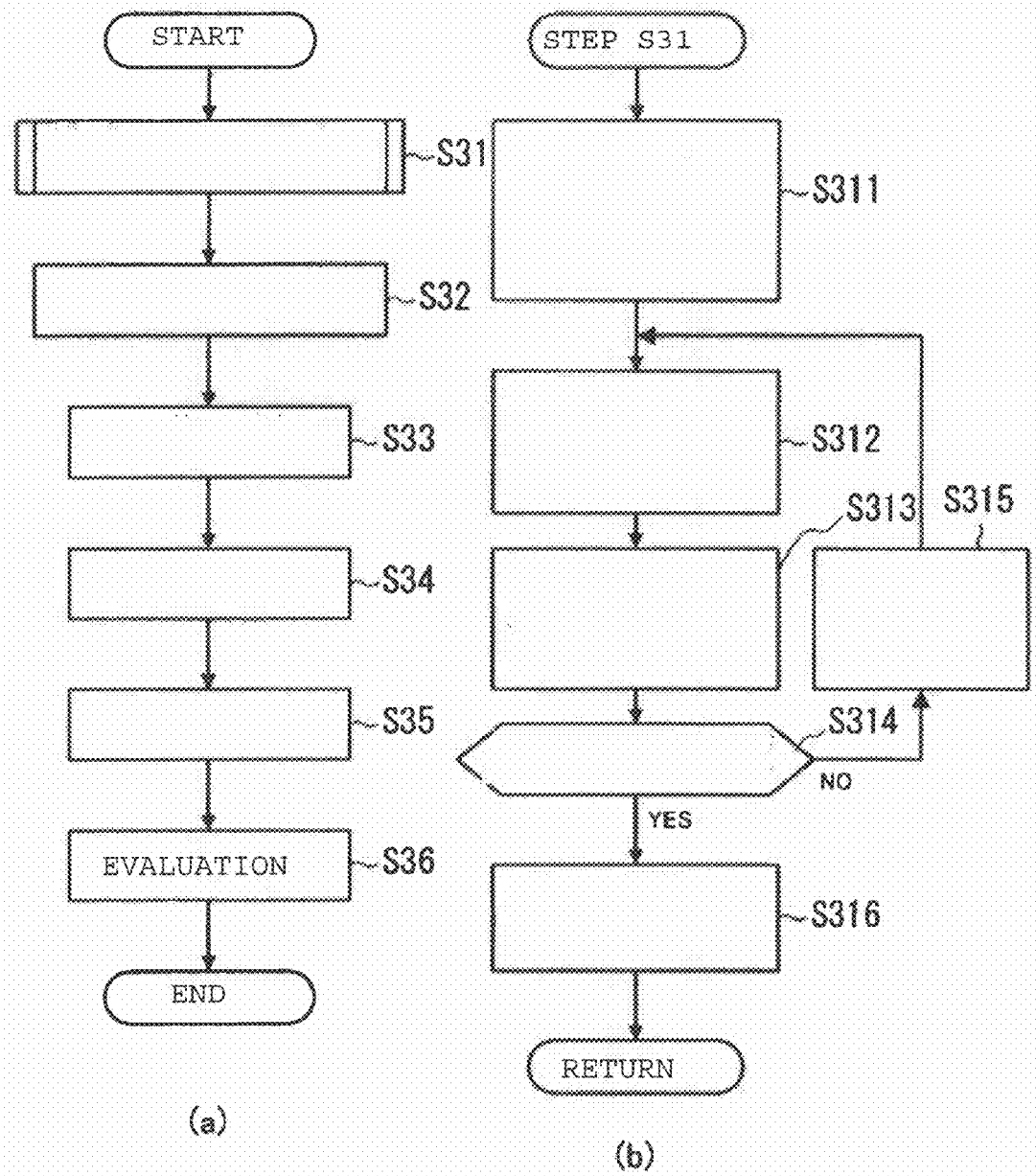
FIGS. 21(*a*) and 21(*b*): Flowcharts showing another embodiment of the inspection method according to the present invention.
Figure 22:
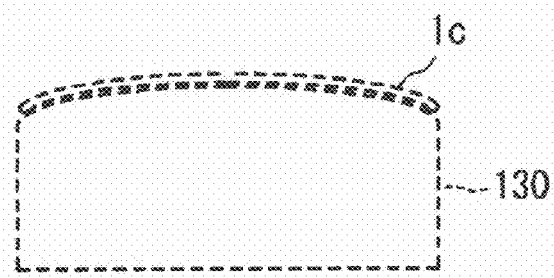
FIGS. 22(*a*) to 22(*d*): Schematic views illustrating an inspection procedure.
Figure 22:
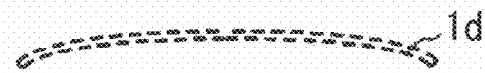
Figure 22:
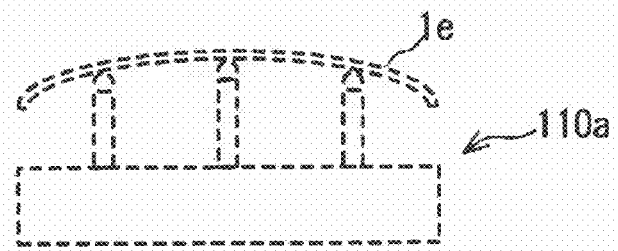
Figure 22:
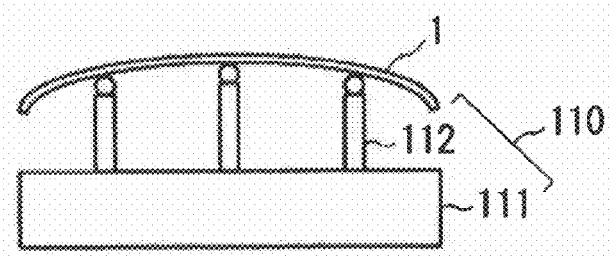

FIG. 21 is a flowchart showing an embodiment of the inspection method according to the present invention. FIGS. 22(*a*) to 22(*d*) are views explaining the inspection procedure. First of all, a computer 120 in FIG. 1 calculates a three-dimensional shape 1*d* of an object 1 to be measured in a weightless state according to its predetermined design shape data 1*c* (CAD data) by a simulation (step S31, FIG. 4(*b*)). The design shape data 1*c* represents a design shape, and a predetermined inspection stand 130 is designed according to the design shape data 1*c* of the object 1. Accordingly, the design shape data 1*c* of the object 1 is the shape of the object 1 in a state that it is placed on the inspection stand 130 (FIG. 4(*a*)), and calculation is proceeded according to the design shape data 1c. Here, since the design shape data 1c of the object 1 in a state that it is placed on the inspection stand 130, is slightly deflected by the gravity, for preparation of a subsequent simulation (step S32), a design shape data 1d (particularly the same in a weightless state) of the object 1 before it is placed on the inspection stand 130, is calculated considering a deflection according to the number and positions of supporting points of the inspection stand 130. Calculation method of the design shape data 1d is described later.

Subsequently, according to the design shape data 1d in a weightless state calculated, a design shape data 1e in a state that the object is placed on a generic inspection stand 110a is calculated (step S32, FIG. 4(c)). Here, the calculated design shape data 1e is stored in a memory device 124 such as a hard disk. Then, the object 1 is placed on an inspection stand 110 of FIG. 1 manually or by using a robot (not shown) (step S33, FIG. 4(d)). Subsequently, an image of an upper surface of the object 1 is captured by a camera 121, and the image captured is retrieved by a computer 120 (step S34). Subsequently, the computer 120 calculates e.g. a profile shape and surface inclination of the object 1 by image processing, calculates a three-dimensional shape of the object 1, and generates a finite element mesh by a known method (step S35). Detail of shape calculation is the same as that of the above-mentioned embodiment, and thus, its explanation is omitted.

Subsequently, based on a comparison of the calculated design shape data 1e stored in the memory device 124 with the three-dimensional shape of the object 1 calculated in step S35, the quality of the shape is evaluated (step S36). In the comparison, a difference amount between the three-dimensional shape of the object 1 calculated in step S35 and the calculated design data 1e at predetermined evaluation points under the condition that the calculated design shape data 1e agrees with the three-dimensional shape of the object 1 calculated in step S35 at three supporting points of the object 1 on the inspection stand 110, and the evaluation is made based on whether or not the difference amount is within a prescribed range.

Thus, in the present invention, from a design shape data of an object in a state that it is placed on a predetermined inspection stand 130, a design shape data of the object in a state that it is placed on a generic inspection stand 110, is obtained, whereby an evaluation based on a comparison of the design shape data with the shape data in a state that the object is placed on a generic inspection stand 110, becomes possible, and an excellent effect that preparation of inspection stand for each product model becomes unnecessary. Further, instead of steps S31 and S32, a design shape data in a state that the object is placed on a generic inspection stand 110 may be calculated based on a predetermined design data 1c of the object 1. This calculation method is suitable in a case where the object 1 has a shape and position not easily deformable by the effect of gravity, since the method can reduce the amount of calculation by the computer 120.

Here, there are several methods of calculating three-dimensional shape in a weightless state in step S31, and for example, the following method can be used. First of all, to a three-dimensional shape of design data, instead of gravity applied as an external force, a force having the same magnitude as the gravity and opposite direction from the gravity is applied to simulate a shape from which the effect of gravity is removed (namely, a shape in a weightless state), and the shape obtained is designated as an "initial shape" (step F311). At this time, since it is necessary to support a glass sheet so that the glass sheet does not move by an applied force, the glass sheet is assumed to be supported at an upper surface of the glass sheet at positions corresponding to the supporting positions of the predetermined inspection stand.

Subsequently, the shape of the glass sheet of "initial state" in a state that it is placed on the predetermined inspection stand, is simulated by a computer simulation (step S312). Then, the shape obtained by the simulation is compared with its design shape data (step S313), and if the positions of nodes of meshes of the respective shapes agree with each other, the simulated shape of weightless state is judged to be proper.

However, there is a difference between the positions of nodes of these shapes in most cases, the amount of displacement at each node of the meshes used in the simulation is checked, and when the average of the displacements at the nodes is a predetermined value or more (step S314), the "initial state" is changed so as to cancel the displacement (step S315), and returns to step S312 to carry out the same process again. Of course, the judgment may be based on whether or not the maximum value of the displacements exceeds a predetermined value, the judgment may be based on whether or not the minimum value of the displacements is less than a predetermined value, or the judgment may be based on the displacements at predetermined nodes selected in advance. Thereafter, steps S312 to S315 are repeated until the judgment result in step 314 converges, and if the displacements at the nodes are within a predetermined displacement range, the "initial state" at this time is determined as "three dimensional shape in a weightless state" (step S316). The displacement range criteria is appropriately determined according to the shape or the requirements of standards such as JIS (Japan Industrial Standards), etc.

EXAMPLES

Then, in order to evaluate the validity of the method of simulating weightless state shown in FIG. 3(b), a computer simulation was carried out, and its detail is described.

Figure 23:
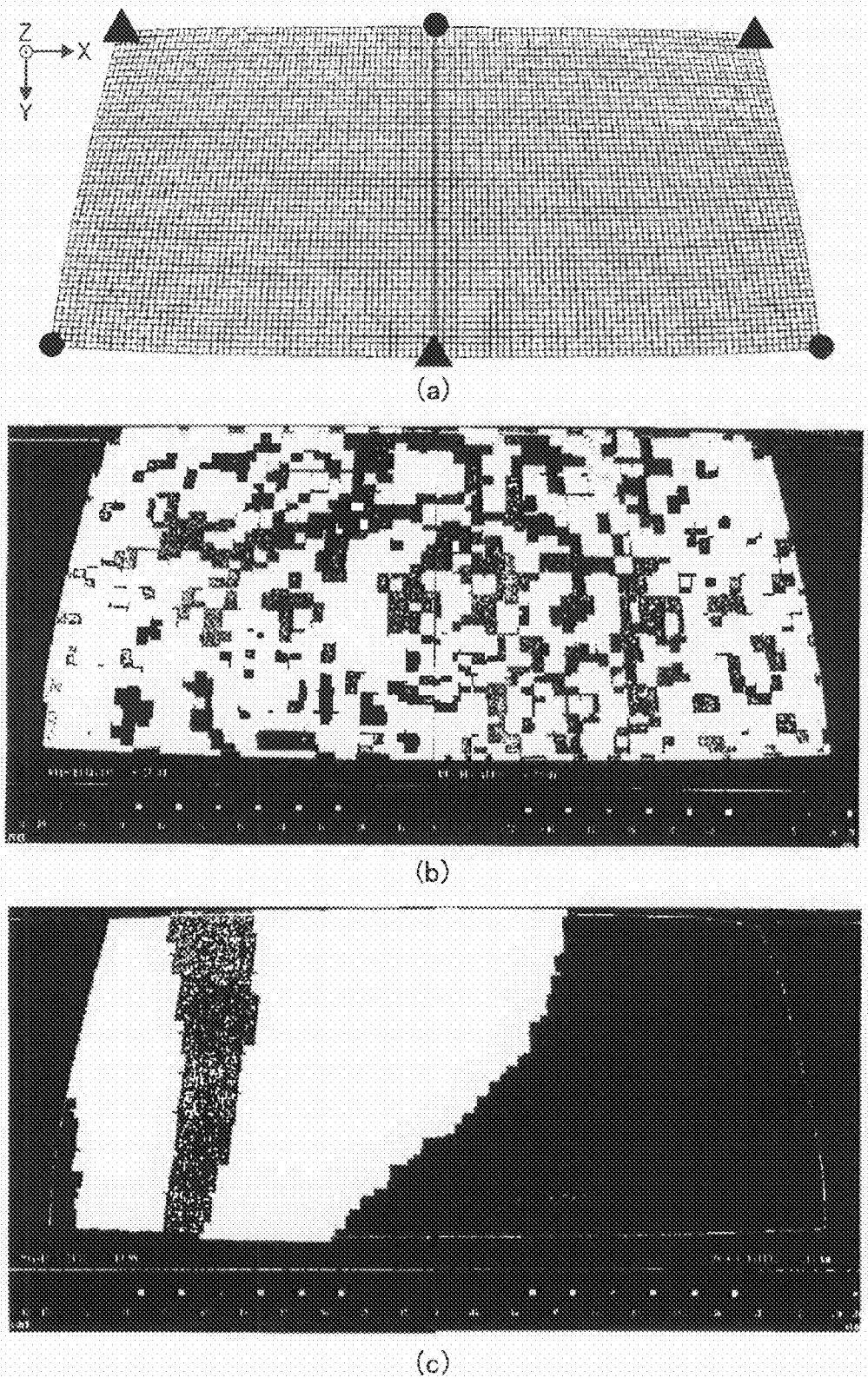
FIG. 23(*a*): A plan view showing a shape model (finite element mesh) of a glass sheet in the example of the present invention.
Figure 23A:
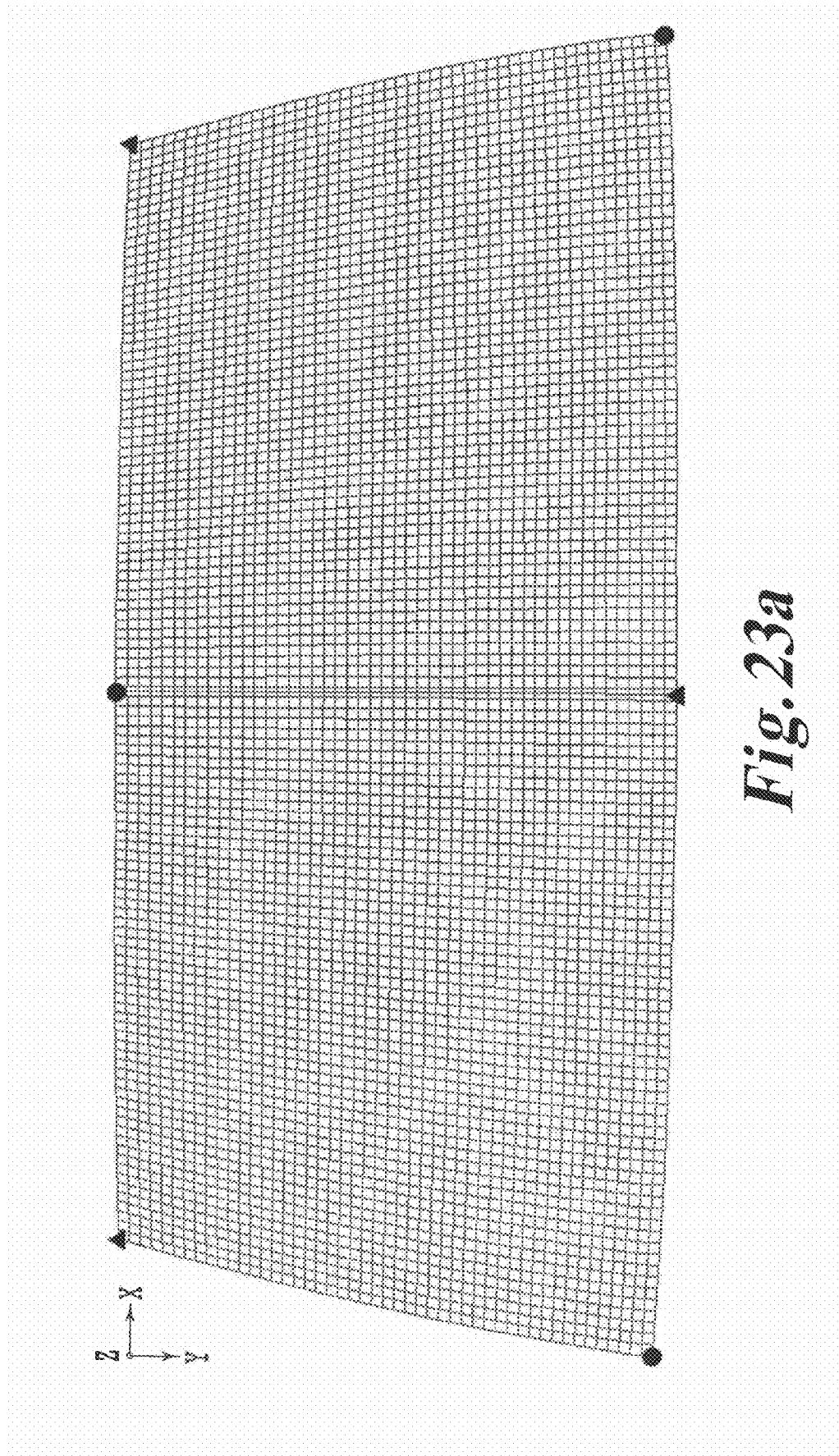
Figure 23B:
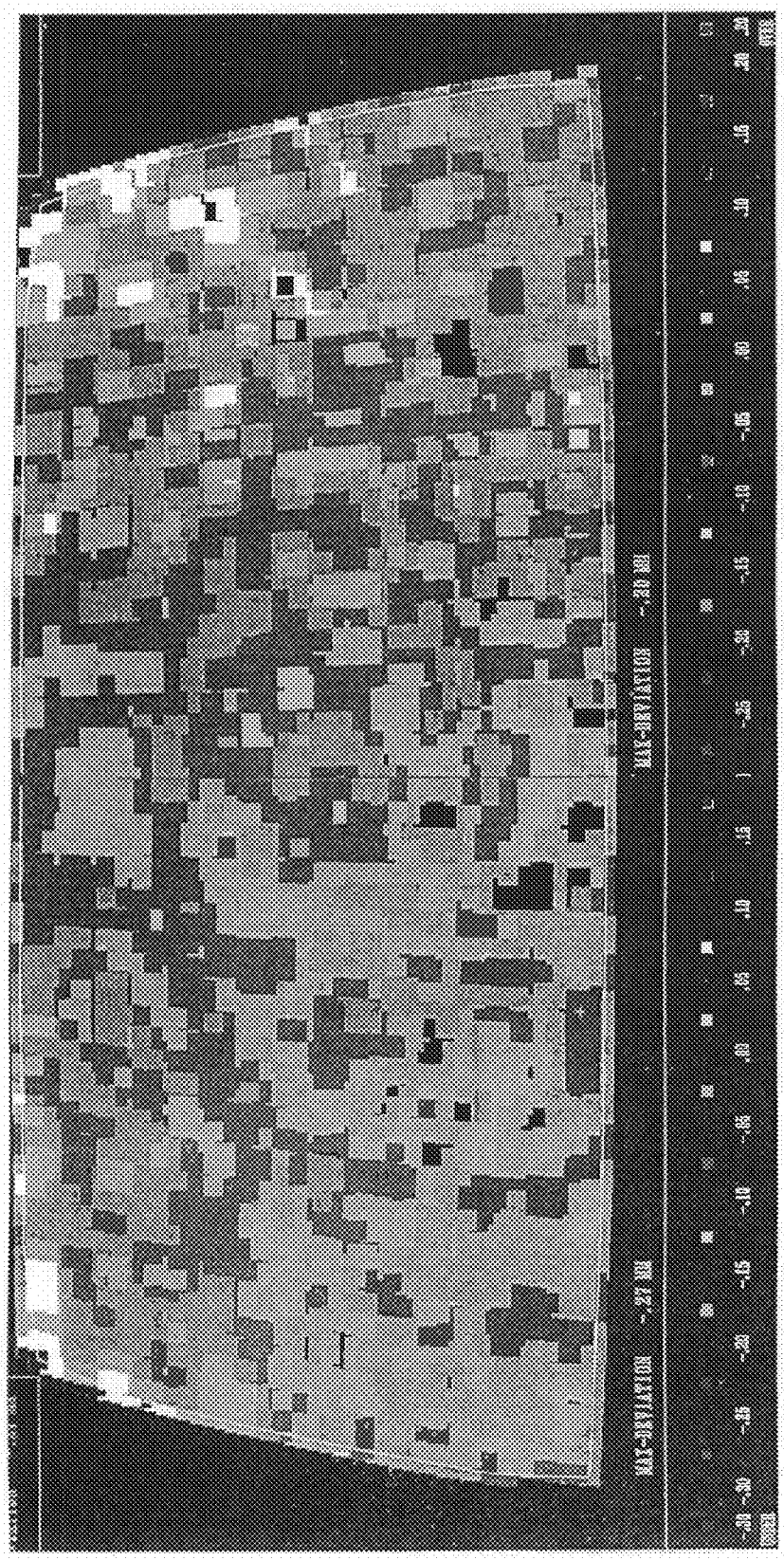
Figure 23C:
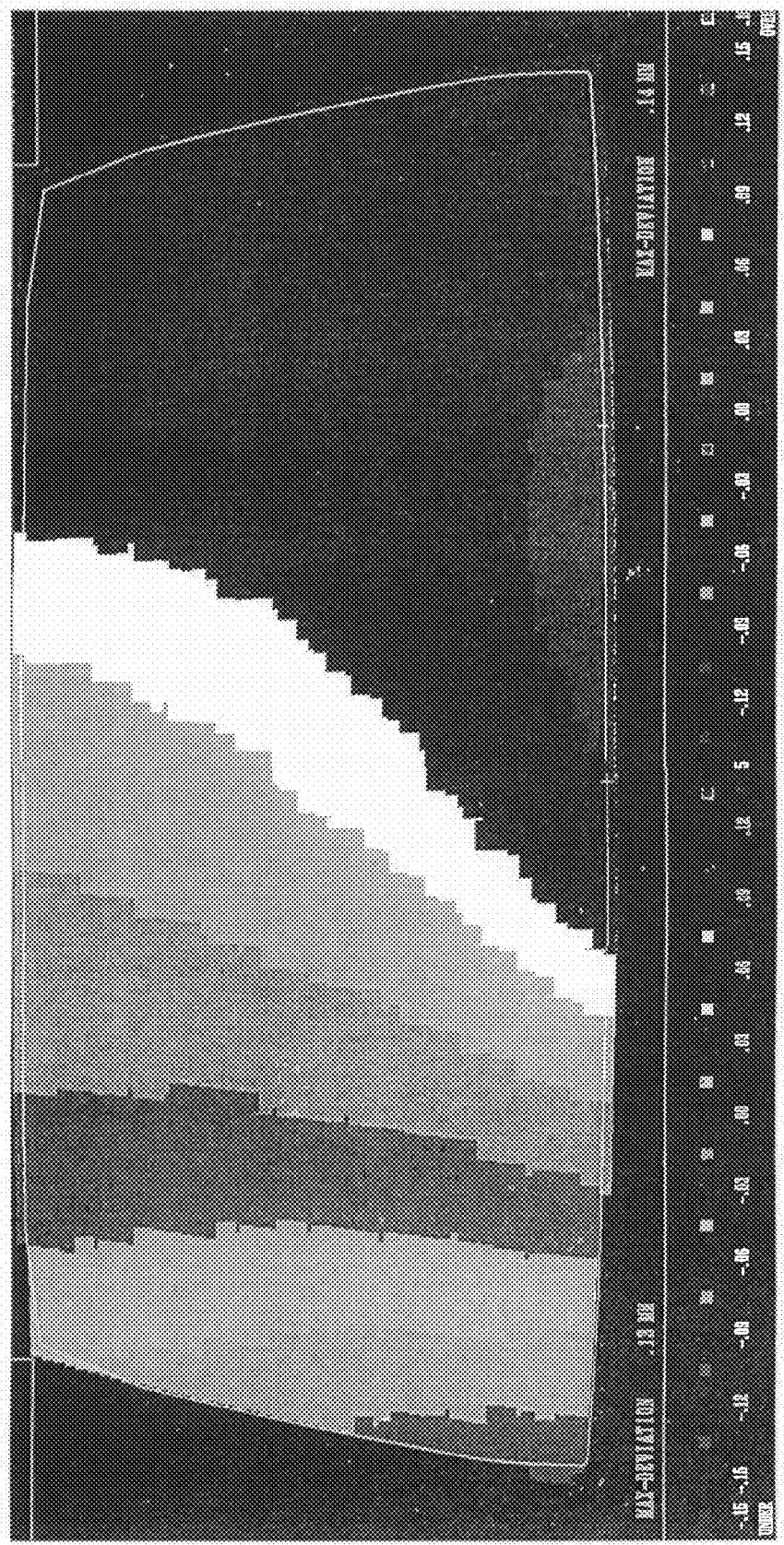

FIG. 23(a) is a plan view showing a shape model of a glass sheet in an example of the present invention, FIGS. 23(b) and 23(c) are each a plan view showing a comparison result of simulation result and actual measurement. First of all, as shown in FIG. 23(a), a shape model of a glass sheet of substantially trapezoidal shape in a front view, is regarded as a shape model constituted by a group of a large number of plate bending elements (each being a square in front view and having a thickness "0"), and a deflection analysis by an finite element method is carried out with respect to the shape model. At this time, it is assumed that the glass sheet has a thickness of 2.8 mm, a Young's modulus of 70,600 MPa and a Poisson's ratio of 0.23. Further, as an analysis software ABAQUS/Standard of ABAQUS Corporation in U.S. is used.

Here, black dot marks and black triangle marks in the figure indicate points supporting the glass sheet. The shape of the glass sheet was actually measured in a state that it is supported at three point of black dot symbols, and thereafter, the shape of the glass sheet was actually measured in a state that it was supported at total six points of black dot symbols and black triangle symbols in the same manner. Subsequently, the shape of glass sheet as it is supported at three points was designated as an "initial shape" defined in step S41 of FIG. 3(b), and the flow shown in FIG. 3(b) was repeated to determine the shape in a weightless state. Then, by using the shape in a weightless state obtained by the simulation, a state that the glass is supported at six points was simulated, and the simulation result was compared with a shape actually measured in a state that the glass was supported at six points on the inspection stand, to study the amount of shape difference.

The result is shown in FIG. 23(b) where the shape difference is indicated by darkness. It was confirmed that the difference (displacement in Z direction) between corresponding nodes (nodes of meshes) of the simulation result and the actual measurement at the lower left corner of the figure was −0.3 mm, that in the center of glass sheet was 0 mm and that at the upper right corner was +0.2 mm. Namely, the shape difference in the entire glass was within ±0.3 mm, which indicates the result was good. Here, in the above explanation, a case of no difference is designated as "0", a case where a node of reference shape is under a node of another shape is designated as "−", and a case where a node of reference shape is above a node of another shape is designated as "+". Further, since the displacement amount in X and Y directions are extremely small, the shape difference was measured only with respect to displacements in Z direction in this example.

Further, an actually measurement shape of three point supporting was designated as the "initial shape" of step S41, a weightless state was simulated based on the initial shape, and the state of three point supporting was simulated again by using the simulated weightless state. FIG. 23(c) shows the result. Namely, the difference was −0.13 mm at a left corner and the difference increases a towards a right corner, it becomes 0 mm at the center of the glass sheet, and it becomes about +0.14 mm at the right end. This shows that the result was good.

INDUSTRIAL APPLICABILITY

As described above, the present invention provides a shape inspection method and a shape inspection apparatus suitable for shape inspection of an window glass for automobiles. Further, it is apparent that the present invention can be applied to an inspection of window glass used not only for automobiles but also for e.g. railroad vehicles, airplanes, ships or buildings. Further, the present invention can be applied not only to an inspection of glass sheet but also to inspections of mirror surface objects, plate shaped objects or lenses.

The entire disclosure of Japanese Patent Application No. 2005-206498 filed on Jul. 15, 2005 including specification, claims, drawings and summary is incorporated herein by reference in its entirety.

What is claimed is:

1. A shape inspection method comprising a first step of placing an object to be measured on an inspection stand for actual measurement, a second step of obtaining information of the surface shape of the object, a third step of calculating shape data of the object in a weightless state based on the information of the surface shape of the object, and a fourth step of recalculating the shape data of the object in a state that the object is placed on a predetermined inspection stand based on the shape data in the weightless state of the object, and judging the quality of the object based on the recalculated shape data of the object.

2. The shape inspection method according to claim 1, wherein the shape data of the object in the weightless state is obtained by simulating a state in which a force having a direction opposite from that of the gravity is applied to the object having the shape data obtained by the actual measurement.

3. The shape inspection method according to claim 1, which comprises instead of the forth step, a step of judging the quality of the object based on comparison of the shape data of the object in the weightless state calculated in the third step with predetermined design data of the object.

4. The shape inspection method according to claim 1, wherein in the second step, the image of the object is captured and the surface shape data is obtained from the captured image.

5. The shape inspection method according to claim 1, wherein the object is a glass plate.

6. The shape inspection method according to claim 5, wherein the glass plate is a window glass for automobiles.

7. The shape inspection method according to claim 1, wherein the inspection stand for actual measurement has a first, a second and a third supporting portions for supporting the object.

8. A shape inspection method comprising a first step of calculating design shape data of an object to be measured in a weightless state based on design shape data of the object in a state that the object is placed on a predetermined inspection stand, a second step of calculating design shape data of the object in a state that the object is placed on an inspection stand for actual measurement based on the design shape data of the object in a weightless state, a third step of placing the object on the inspection stand for actual measurement, a fourth step of obtaining information of the surface shape of the object, and a fifth step of judging the quality of the object based on the design shape data of the object in a state that the object is placed on the inspection stand for actual measurement and the information of the surface shape of the object.

9. The shape inspection method according to claim 8, wherein the design shape data of the object in a weightless state is obtained by simulating by a computer simulation a state in which a force in a direction opposite from the gravity is applied to the object having design shape data in a state that the object is placed on a predetermined inspection stand.

10. The shape inspection method according to claim 8 comprising instead of the first step and the second step, a step of calculating design shape data of the object in a state that the object is placed on the inspection stand for actual measurement based on design shape data of the object in a state that the object is placed on a predetermined inspection stand.

11. The shape inspection method according to claim 8, wherein in the fourth step, image of the object is captured and the surface shape data is calculated from the captured image.

12. The shape inspection method according to claim 8, wherein the object is a glass plate.

13. The shape inspection method according to claim 12, wherein the glass plate is a window glass for automobiles.

14. The shape inspection method according to claim 8, wherein the inspection stand for actual measurement has a first, a second and a third supporting portions for supporting the object.

15. A shape inspection apparatus comprising an inspection stand for actual measurement to be used for placing an object to be measured, a camera for obtaining information of the surface shape of the object, and a computer for calculating the shape data of the object in a weightless state based on the information of the surface shape of the object, recalculating the shape data of the object in a state that the object is placed on a predetermined inspection stand based on the shape data of the object in the weightless state, and judging the quality of the object based on the recalculated shape data.

16. The shape inspection apparatus according to claim 15, wherein the computer judges the quality of the object based on comparison of the shape data of the object in the weightless state calculated and predetermined design shape data of the object, instead of recalculating shape data of the object in the state that the object is placed on the predetermined inspection stand and judging the quality of the object based on the recalculated shape data.

17. The shape inspection apparatus according to claim 15, wherein the inspection stand for actual measurement has a first, a second and a third supporting portions for supporting the object.

18. A shape inspection apparatus comprising an inspection stand for actual measurement on which an object to be measured is placed, a camera for obtaining information of the surface shape of the object, and a computer for calculating design shape data of the object in a weightless state based on design shape data of the object in a state that the object is placed on a predetermined inspection stand, and calculating design shape data of the object in a state that the object is placed on the inspection stand for actual measurement based on the design shape data of the object in the weightless state, and judging the quality of the object based on the calculated design shape data and the information of the surface shape of the object.

19. The shape inspection apparatus according to claim 18, wherein the calculator calculates design shape data of the object in a state that the object is placed on the inspection stand for actual measurement based on design shape data of the object in a state that the object is placed on a predetermined inspection stand, instead of calculating design shape data of the object in a weightless state based on design shape data of the object in a state that the object is placed on the predetermined inspection stand and calculating design shape data of the object in a state that the object is placed on the inspection stand for actual measurement based on the design shape data of the object in a weightless state.

20. The shape inspection apparatus according to claim 18, wherein the inspection stand for actual measurement has a first, a second and a third supporting portions for supporting the object.

* * * * *